(12) United States Patent
Krtolica

(10) Patent No.: US 6,275,622 B1
(45) Date of Patent: Aug. 14, 2001

(54) IMAGE ROTATION SYSTEM

(75) Inventor: Radovan V. Krtolica, Los Gatos, CA (US)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/107,231

(22) Filed: Jun. 30, 1998

(51) Int. Cl.[7] .................................................. G06K 9/32
(52) U.S. Cl. ............................................ 382/296; 382/297
(58) Field of Search .................................. 382/296, 297, 382/295, 232, 173, 300, 305, 284; 358/449, 450, 451, 460; 345/437, 126, 441, 505, 518

(56) References Cited

U.S. PATENT DOCUMENTS

| | | | |
|---|---|---|---|
| 4,995,089 | * 2/1991 | Altrieth, III | 382/46 |
| 5,301,036 | * 4/1994 | Barrett et al. | 358/448 |
| 5,479,525 | * 12/1995 | Nakamura et al. | 382/297 |
| 5,598,181 | * 1/1997 | Kermisch | 345/126 |
| 5,634,088 | * 5/1997 | Banton | 358/1.2 |
| 5,734,760 | * 3/1998 | Yoshida | 382/296 |
| 5,734,875 | * 3/1998 | Cheng | 395/516 |
| 5,909,222 | * 6/1999 | Umeshima | 345/437 |
| 5,966,116 | * 10/1999 | Wakeland | 345/126 |
| 5,973,721 | * 10/1999 | Bergmans et al. | 347/262 |
| 5,991,450 | * 11/1999 | Ohsawa et al. | 382/245 |

* cited by examiner

*Primary Examiner*—Leo Boudreau
*Assistant Examiner*—Kanji Patel
(74) *Attorney, Agent, or Firm*—Fenwick & West LLP

(57) ABSTRACT

An image rotation system (205) allows for rotating an image between a first image position and a second image position. The image rotation system (205) includes an orientation module (220), a partition module (portions of 225, 235, 240), a rotation module (235), and a concatenation module (portions of 225, 235, 240, 245). The orientation module (220) is disposed to receive the image to identify the initial image orientation. The partition module is disposed to receive the oriented image to partition the image into at least one sub-image. The rotation module (235) is disposed to receive each sub-image of the partitioned image to rotate the pixels of each sub-image. The concatenation module is disposed to receive each rotated sub-image to concatenate the rotated sub-images to produce the image in the final image position. A method for rotating images in a limited memory environment is also disclosed.

26 Claims, 35 Drawing Sheets

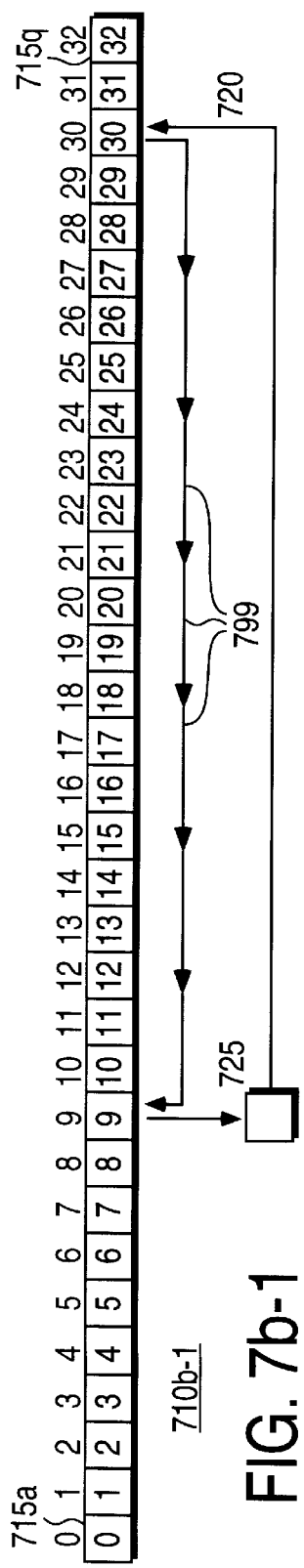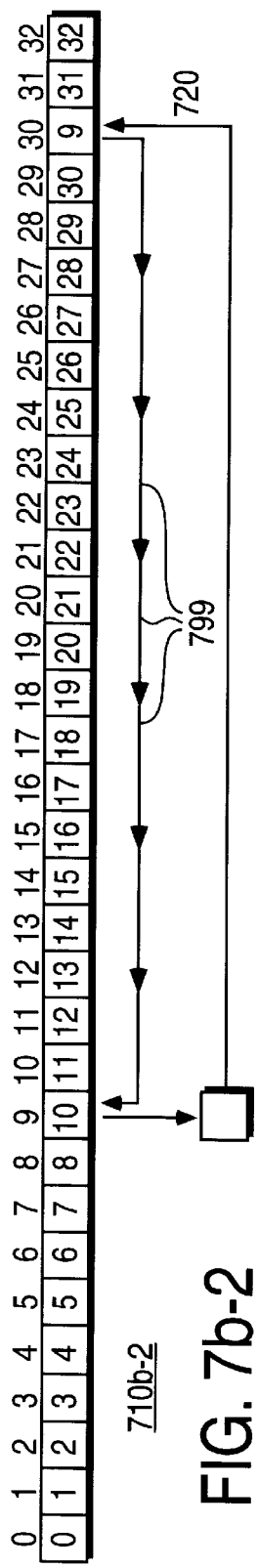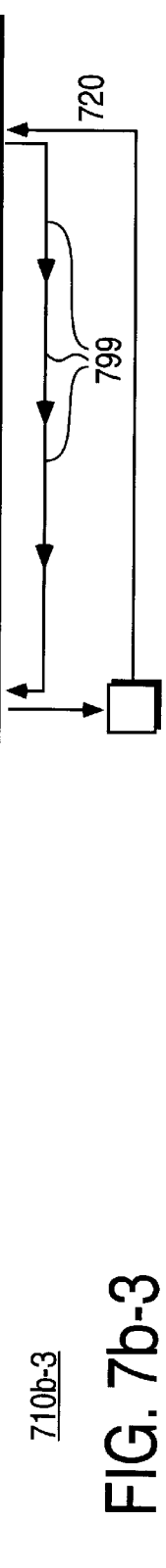
FIG. 7b-1  FIG. 7b-2  FIG. 7b-3

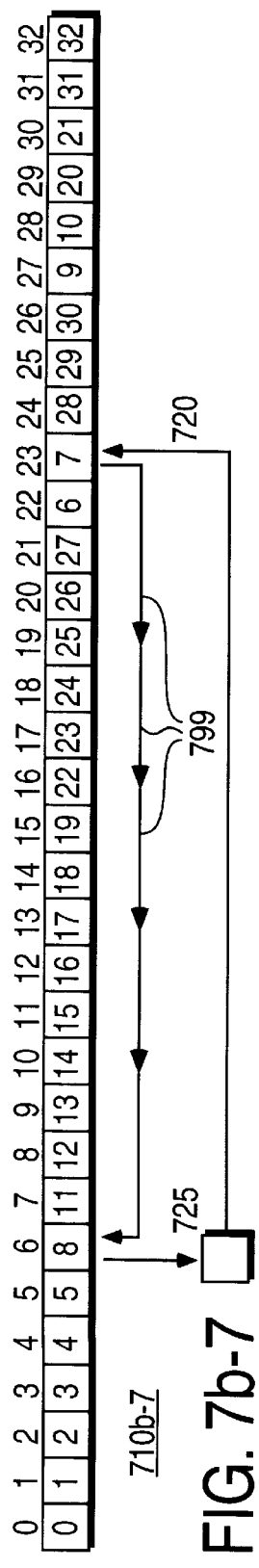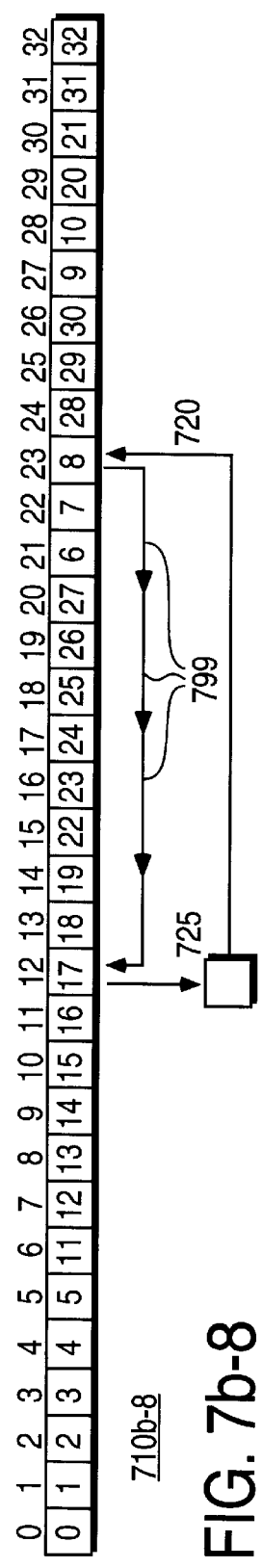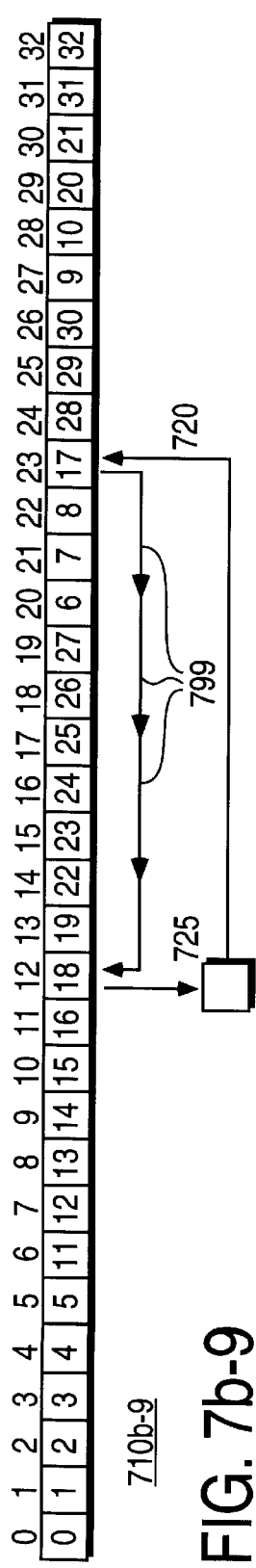

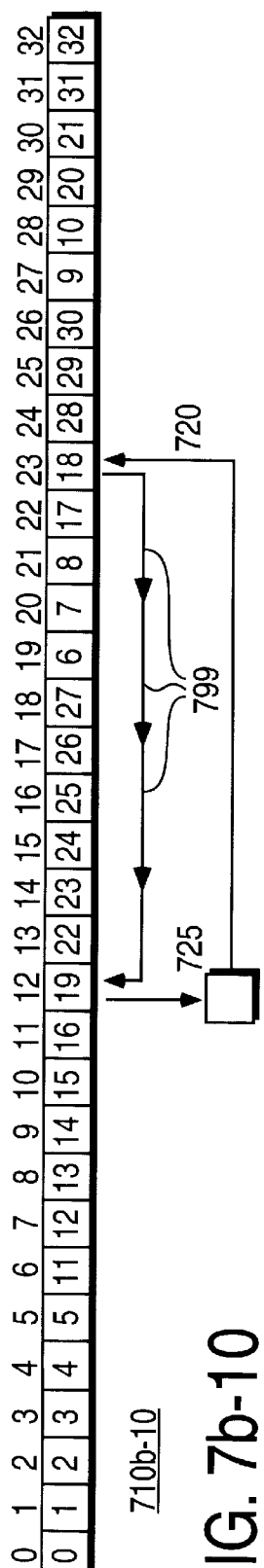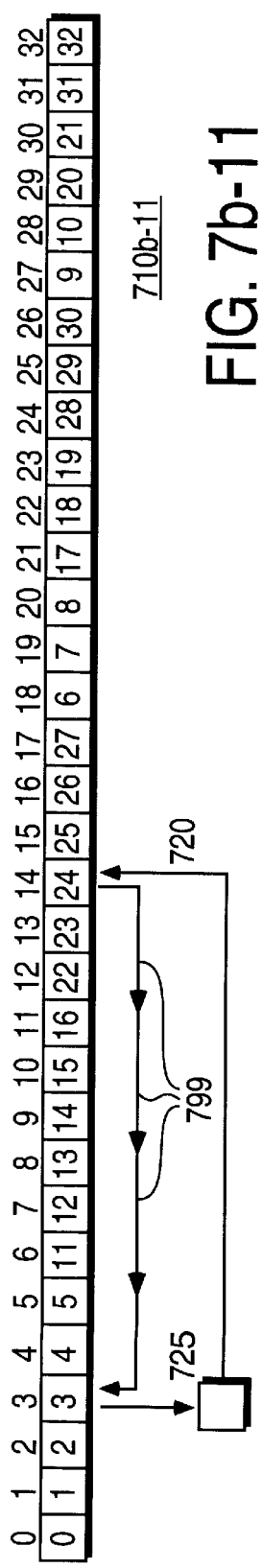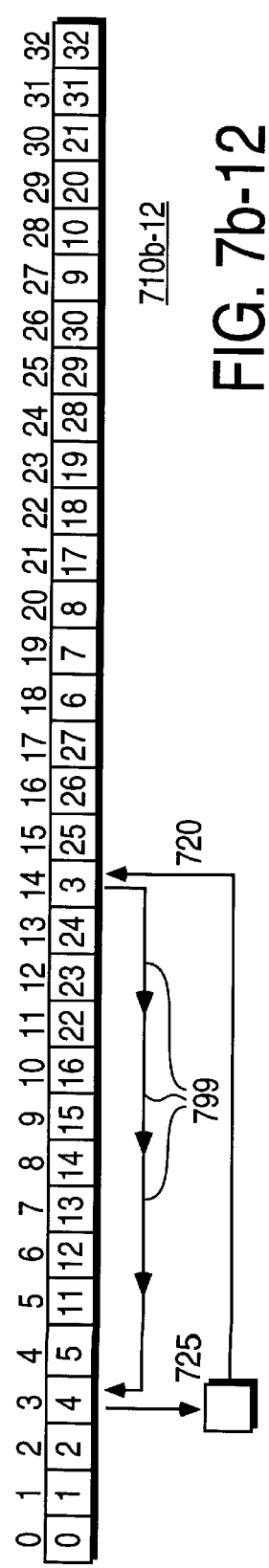

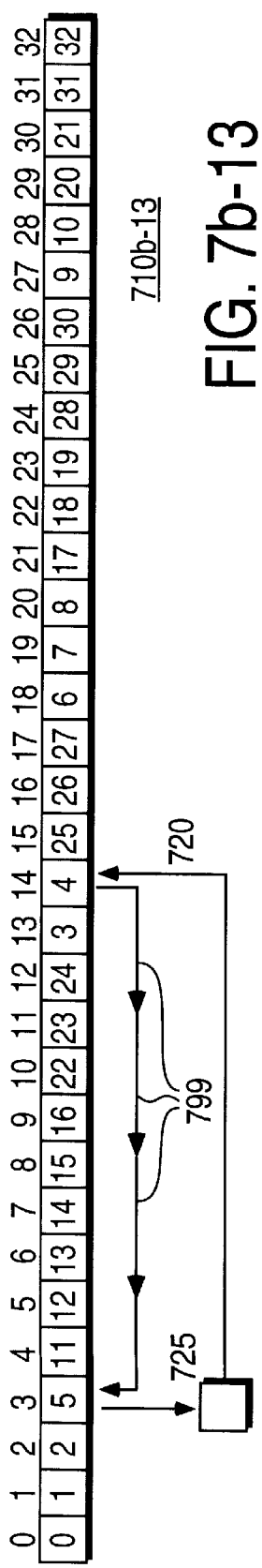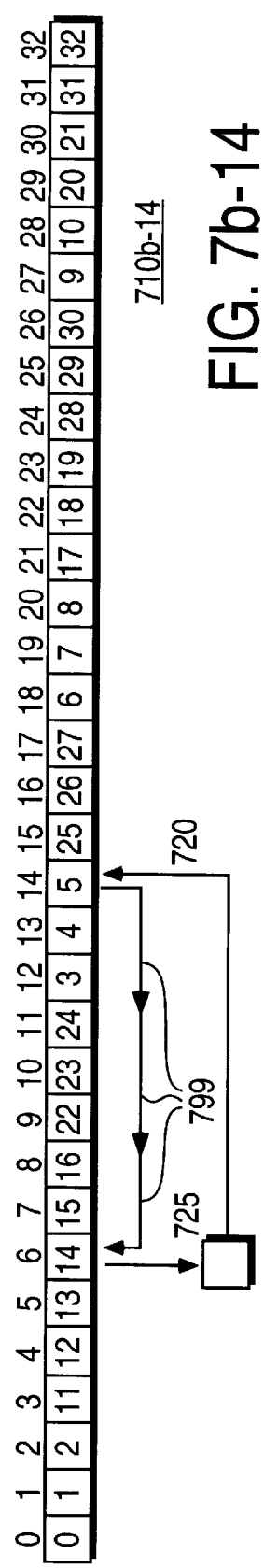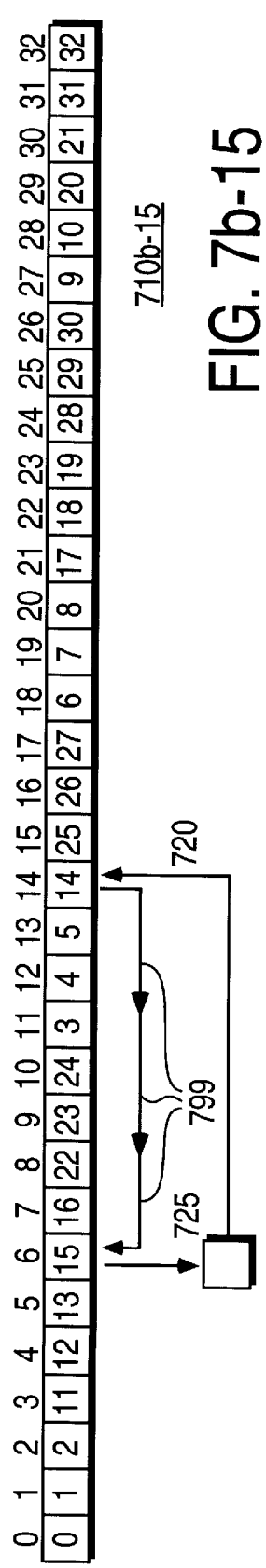

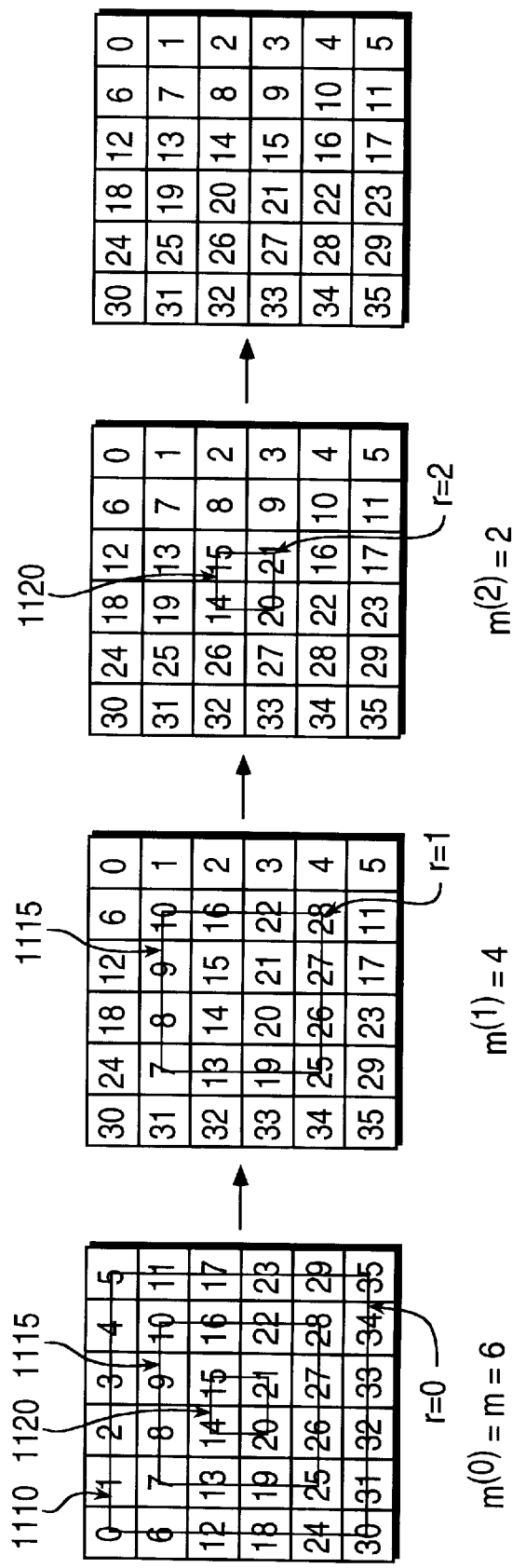

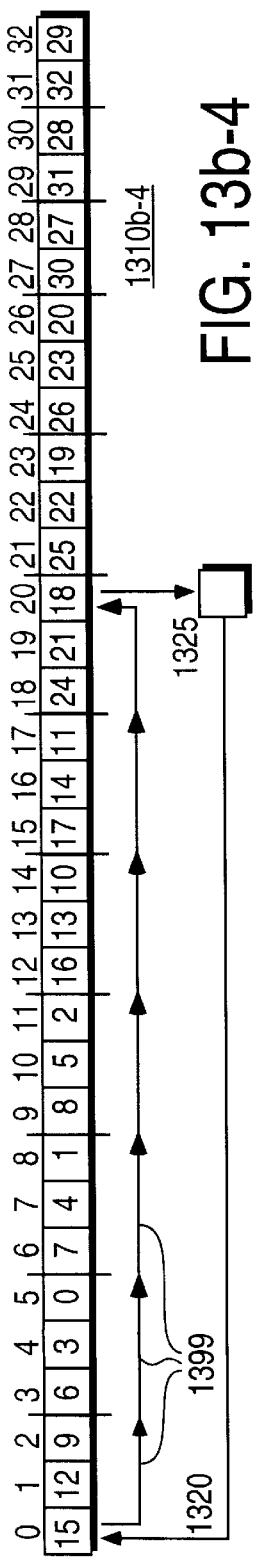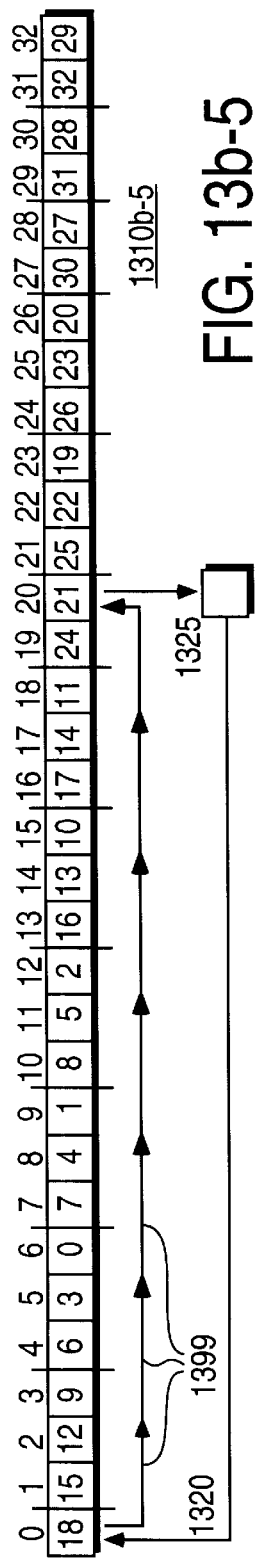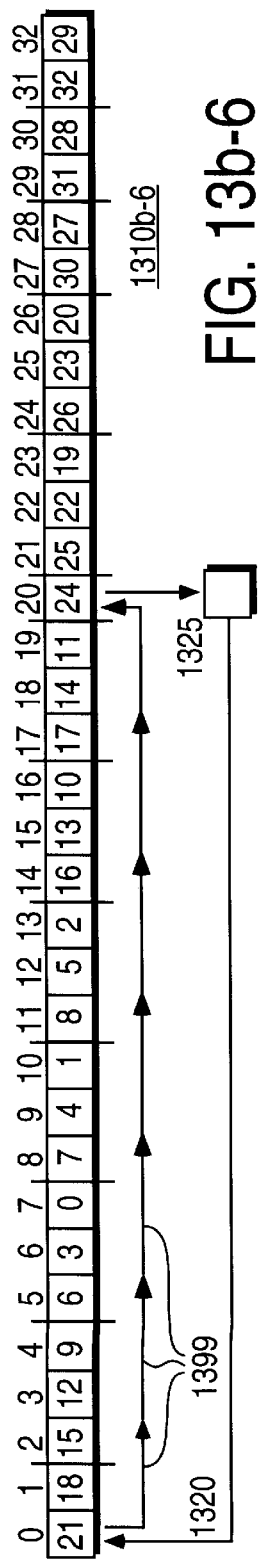

IMAGE ROTATION SYSTEM

BACKGROUND OF THE INVENTION

1. Field of the Invention

The present invention relates to digital image processing systems, and more particularly, to image processing systems that have limited memory resources and that allow for image manipulation.

2. Brief Description of Background Arts

Conventional image data processing systems have one or more additional large memory arrays in addition to a primary memory array to accommodate data intensive processes, for example rotating an image. To rotate the image by ninety (90) degrees in an image data processing system requires a significant amount of memory array space. Specifically, to rotate the image, a large amount of image data must be processed and moved between two or more of the large memory arrays.

There are significant drawbacks of the conventional image data processing systems having these additional memory arrays. For example, because memory arrays are expensive, each additional memory array significantly increases the overall cost of the image data processing system. In addition, because memory arrays are relatively large and consume valuable space in electronic circuit environments, each additional memory array consumes valuable footprint space within an image data processing system, making such a device undesirable for compact applications.

Attempts to save memory by rotating pixels one-by-one, require that the next source location (i.e., the location of the pixel to be rotated) coincides with the destination address of the previously rotated pixel. This is a chain calculation. Each rotated pixel pushes an old pixel out of its cell, so that this old pixel is the next one to be rotated. Once the destination address is found for this new rotation, another pixel is going to be pushed out of its cell, and the process must be repeated.

The problem with this kind of chain calculation is that it might end up with a destination address that coincides with the initially selected source address before all the image pixels have been rotated. Whether or not this is going to happen depends on the relation between the height and width of the image. As the number of pixel rows and the number of pixel columns of a scanned image can have arbitrary values, this relation cannot be controlled, and the results of the chain calculation are hard to predict. In sum, an attempt to rotate image pixels one-by-one yields unpredictable results for an image of arbitrary size, and might deadlock before the rotation is complete.

Thus, there is a need for an image data processing system and method that (1) allows for image rotation using a limited size memory array, (2) that is also fast and efficient with respect to rotation of the image.

SUMMARY OF THE INVENTION

An image processing system in accordance with the present invention includes an image rotation system (210) and method for rotating an image between a first image position and a second image position or between an initial position and a final position. The image includes two or more pixels that may be arranged in m pixel rows and n pixel columns, where m and n are integer values.

The image rotation system includes an orientation module (220) that receives the image. The orientation module (220) identifies the image as being in the landscape position in response to m less than n or in the portrait position in response to m greater than or equal to n.

As the landscape image position (or orientation) is defined by m<n, the landscape image contains at least one sub-image equal to the maximal inscribed square, and a remaining rectangular sub-image of size m * (n−m). On the other hand, the portrait image position (or orientation) is defined by m≧n, so that the portrait image contains at least one maximal inscribed square, but does not necessarily contain a remaining rectangular sub-image.

If the received image is in the landscape position, the cut module (225) receives the image in the first (initial) image position from the orientation module (220) and rearranges the landscape image into a portrait image composed of a plurality of superimposed sub-images. At least one sub-image is a square of m pixels by m pixels. A rotation module (235) receives this portrait image and rotates the pixels in each of its superimposed sub-images to generate the portrait image in the second image position.

If the received image is in the portrait image position, the rotation module (235) receives the image in the portrait image position and rotates the pixels in each of its superimposed sub-images. At least one of the sub-images is a square of n pixels by n pixels. A collation module (240) receives the portrait image with rotated sub-images and rearranges it into a landscape image. The rows of the landscape image are obtained by concatenation (collation) of rows of all sub-images with the same sub-image row number. The collated landscape image is in the second (final, rotated) position.

The present invention also includes a method for rotating an image by an orthogonal angle or a multiple of ninety degrees to a rotated position. The image may be m pixel rows and n pixel columns, where m and n have integer values. The method includes determining whether m is less than n. When the first image position has a landscape orientation, that is, when m is less than n, the method includes rearranging (cutting) the landscape image into a portrait image composed of a plurality of superimposed sub-images, where at least one sub-image has m pixels by m pixels. The method then includes rotating the pixels in each sub-image in order to ultimately produce the portrait image which is the second (final, rotated) image position.

When m is greater than or equal to n, the first image position is portrait and is composed of a plurality of superimposed sub-images. At least one of the sub-images is a square sub-image of n pixels by n pixels. The method then includes rotating the pixels in each of the superimposed sub-images and rearranging (collating) the portrait image (with rotated sub-images) into a landscape image. The rows of the landscape image are obtained by concatenation (collation) of rows of all sub-images with the same sub-image row number. The collated landscape image is in the second (final, rotated) image position.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

These and other more detailed and specified objects and features of the present invention are more fully disclosed in the following specification, reference being had to the accompanying drawings, in which:

FIGS. 7b-1 through 7b-16 illustrate one embodiment of successive pixel locations within a one-dimensional memory array representation of an image, for rearranging the image by cutting the image in accordance with the present invention;

FIG. 10 is a flow diagram of one embodiment of a process for completing a square from a remainder portion in accordance with the present invention;

FIGS. 11a and 11b (11b-1 to 11b-4) are examples illustrating one embodiment for rotating pixels within a sub-image, or square, in accordance with the present invention;

FIG. 12 is a flow diagram of one embodiment of a process for rotating pixels within a square sub-image in accordance with the present invention;

FIGS. 13b-1 through 13b-24, and 13c illustrate one embodiment of subsequent pixel locations within the one-dimensional image representation, during the process of collation in accordance with the present invention.

DETAILED DESCRIPTION OF THE PREFERRED EMBODIMENTS

The present invention includes a system and a method for rotating an image within a data processing system. In particular, the system and the method illustrated are for rotating an image within a limited memory data processing system.

Figure 1:
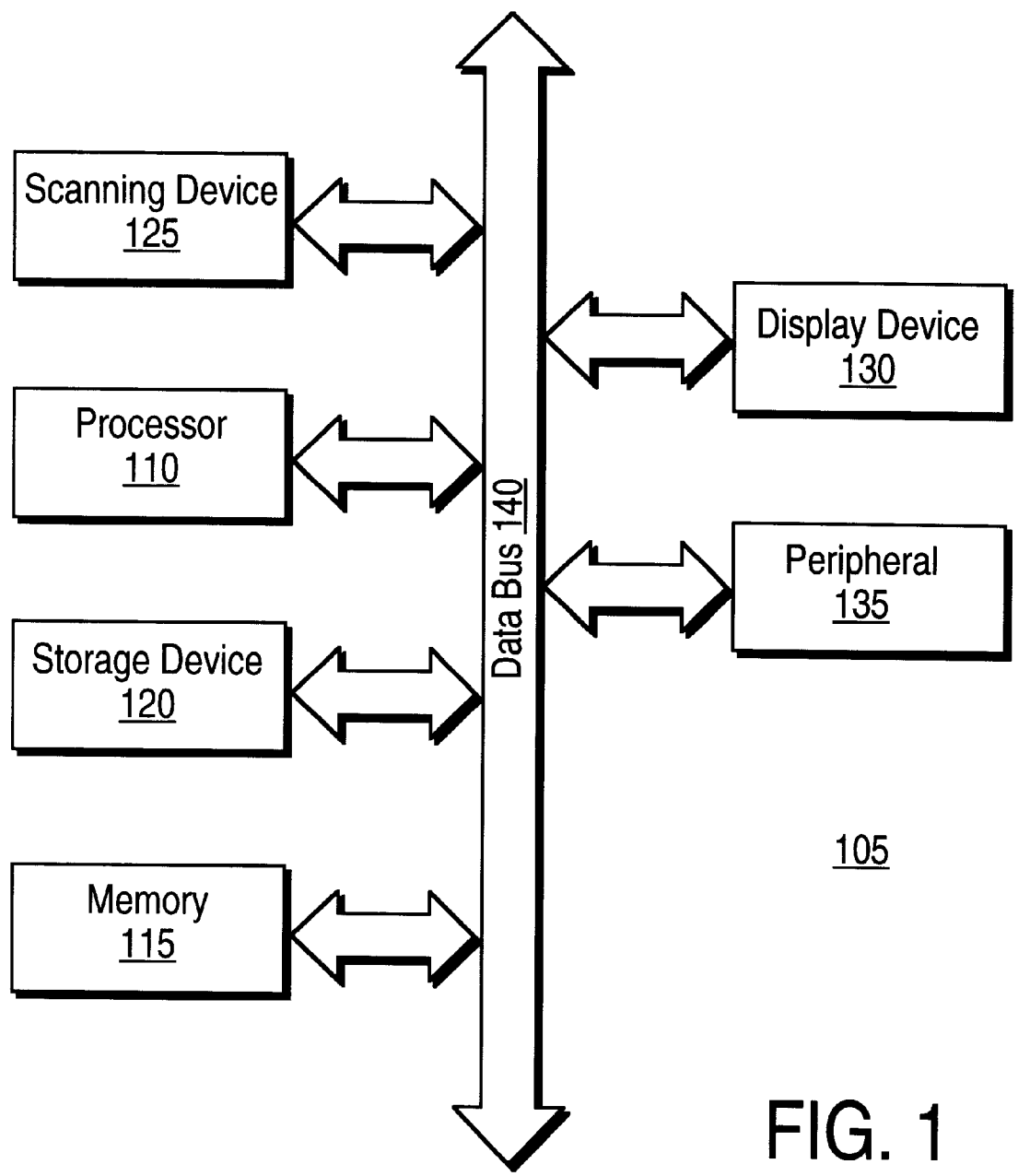
FIG. 1 is a block diagram of one embodiment of a data processing system (105) in accordance with the present invention.

FIG. 1 is a block diagram of one embodiment of a data processing system 105 in accordance with the present invention. The data processing system 105 includes a processor 110, a memory 115, a storage device 120, a scanning device 125, and a data bus 140. The data processing system 105 may also include a display device 130 and one or more peripherals 135. The processor 110, the memory 115, the storage device 120, the scanning device 125, the display device 130, and the peripherals 135 are coupled through the data bus 140.

In one embodiment, the processor 110 is a conventional microprocessor. The processor 110 may be, for example, a x86 or Pentium™ processor by Intel Corporation of Santa Clara, Calif., a PowerPC™ processor by Motorola Incorporated of Schaumburg, Ill., a SPARC™ processor by Sun Microsystems of Palo Alto, Calif., or any other similar processor capable of carrying out computer instructions.

The memory 115 is a conventional memory. The memory 115 may be, for example, a dynamic random access memory ("DRAM"), a read/writable EEPROM, or other similar memory that can store data. Although the memory 115 may be any size, one advantage of the present invention is that it can operate in small or limited memory environments.

The storage device 120 is a conventional storage device. The storage device 120 may be, for example, a hard disk drive, a flash memory card, a compact disc drive, or other similar storage device that can store data for a period of time. It is noted that the memory 115 may include a portion of the storage device 120.

The scanning device 125 is a conventional scanning device. The scanning device may be, for example, a Canon DR 3020 scanning device by Canon K.K. of Japan, a ScanJet IIc/ADF scanning device by Hewlett-Packard Corporation of Palo Alto, Calif., or any other similar black-and-white or color image scanning device that is capable of scanning an image.

The display device 130 may be a conventional display device, for example, a computer monitor screen or a liquid crystal display screen. The peripheral devices may be conventional computer peripheral devices, for example, a keyboard, a mouse or other pointing device, a network card, a modem, a printer, a reproduction machine, or the like.

In one embodiment, the data processing system 105 inputs an image by scanning that image through the scanning device 125. The input image scanned by the data processing system 105 may be further processed by the processor 110. The scanned image may be stored in the memory 115 for immediate image data processing by the processor 110 or may be transferred to the storage device 120 for future image data processing by the processor 110. It is noted that the scanned image may be displayed on the display device 130. It is also noted that the image may be input into the data processing system 105 through a peripheral device 135, for example, an image transmitted through a network or an external source and received by the data processing system 105.

Figure 2:
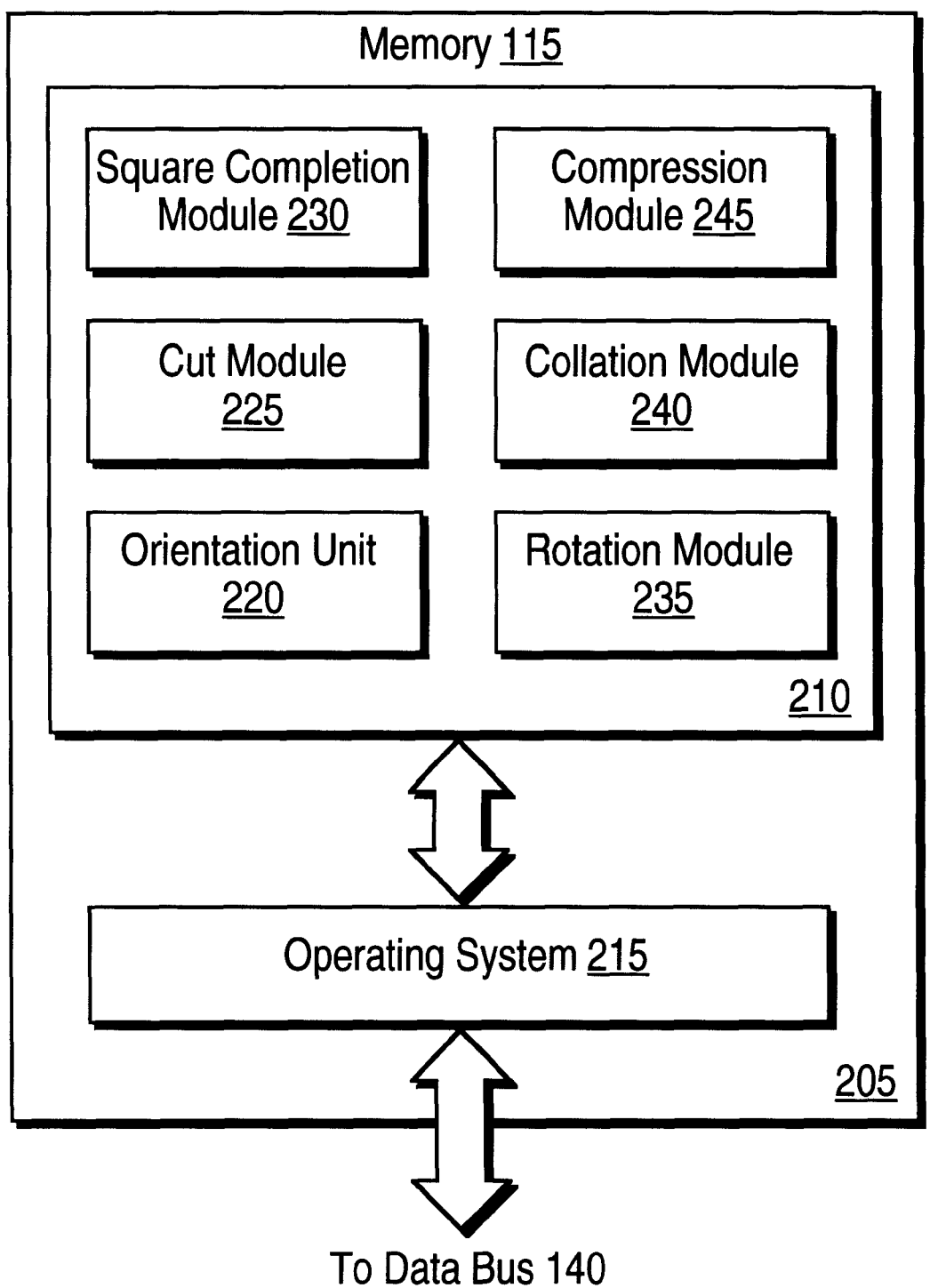
FIG. 2 is a block diagram of one embodiment of an image processing system (205) in accordance with the present invention.

FIG. 2 is a block diagram of one embodiment of an image processing system 205 in accordance with the present invention. The image processing system 205 includes an image rotation system 210. The image processing system 205 may include some portion of an operating system 215. In one embodiment, the image rotation system 210 and the operating system 215 are resident in the memory 115. It should be understood to one skilled in the art that the operating system may be incorporated into the image rotation system 210 and that portions of the image processing system may be present in the storage device 120. In addition, it is noted that the image rotation system 210 operates in conjunction with the processor 110 by passing instructions to and from the processor 110 through the data bus 140.

The image rotation system 210 includes an orientation unit (module) 220, a cut module 225, a square completion module 230, a rotation module 235, a collation module 240, and a compression module 245. The orientation unit 220 identifies whether the image received by the data processing system 105 is in landscape orientation (e.g., 11.0"×8.5" or number of pixel rows less than pixel columns) or is in portrait orientation (e.g., 8.5"×11.0" or number of pixel rows greater than pixel columns).

The orientation unit 220 is also used to help determine how the image will be divided or partitioned into sub-images, as is described below. Further, the present invention may include a partition module that may include a portion of the cut module 225, the rotation module 235, and the collation module 240. The partition module may use a portion of each module, either alone or in combination, to partition the image into one or more sub-images.

Further, the present invention may also include a concatenation module that may include a portion of the cut module 225, the rotation module 235, the collation module 240, and the compression module 245. The concatenation module may use a portion of each module, either alone or in combination, to concatenate partitioned sub-images to produce the rotated or final image.

In one embodiment, the modules 220, 225, 230, 235, 240, 245 are implemented in computer software. One skilled in the art, however, will recognize that the modules 220, 225, 230, 240, 245 may also be implemented in hardware, firmware, or any combination of software, hardware, and/or firmware.

When the pixels of a portrait image are ordered lexicographically into a linear memory array, all its sub-images corresponding to maximal inscribed squares are represented by compact sequences of contiguous pixels in the array. However, when the pixels of a landscape image are ordered lexicographically into a linear memory array, the pixels of one sub-image corresponding to a maximal inscribed square are interlaced with pixels from other sub-images.

Therefore, when the image in the first position has portrait orientation, each of its sub-images can be rotated immediately. When the image in the first position has landscape orientation, it must be rearranged into an intermediate portrait image, composed of superimposed maximal inscribed square sub-images, where each sub-image contains the same pixels as the corresponding sub-image in the final portrait position. This rearrangement is done by the cut module 225.

Once the image has (initial or intermediate) portrait orientation, its square sub-images are rotated subsequently, one at a time, by the rotation module 235. This is (roughly) the final processing step for images with landscape orientation in the first position. In this case, sub-image rotations yield the second (or rotated, or final) position of the image, which is now portrait oriented.

For images with portrait orientation in the first (initial) position, however, sub-image rotations yield an intermediate portrait image. In order to obtain the second (or final, or rotated) landscape position of the image, the intermediate portrait image should be rearranged. Specifically, the rows of the rotated landscape image can be retrieved from the intermediate portrait image by concatenating all of its sub-image rows that have the same row number. This is accomplished by the collation module 240. Once all rows of the landscape image are collated (concatenated), the second (or final, or rotated) landscape position of the image is obtained, and the rotation of the image with portrait orientation in the first (initial) position is complete.

As previously mentioned, one of the sub-images of the image to be rotated may be a rectangular remainder (i.e., an incomplete maximal inscribed square). The rotation module 235 handles square sub-images. If partition of the image into maximal inscribed squares leaves a rectangular remainder, this remainder may be processed independently, and in parallel, as if it were a separate image or it may be further processed by the square completion module 230.

If processed independently, the remainder may be treated as another image and it may be processed in a way similar to the processing of the rest of the image, e.g., determining orientation, maximal inscribed squares, and rotation. Once processed, the remainder image may be concatenated, or collated, with the rest of the image, which is processed separately.

If the square-completion module 230 is used, the sub-image is completed into a square by adding filler pixels to the rectangular remainder. In particular, the square completion module 230 appends to the image array the number of memory cells necessary for completion of the square. The square-completion module 230 then reorders the pixels of the remainder sub-image and the filler pixels so that the lexicographical order of all the pixels corresponds to a maximal inscribed square.

After the rotation module 235 has completed separate rotations of all sub-images (one of which might be a square completed by module 230 containing, in that case, filler pixels), the compression module 245 compresses the image to remove the filler pixels. Specifically, the compression module 245 inspects all the pixel cells to check the presence of a filler pixel in a cell and suppresses such a cell. When the image is exactly partitioned in one or more maximal inscribed squares (that is, when there is no remainder rectangular sub-image), the compression module 245 does not affect the image. Once the image is rotated from its first (initial) position to its second (final) position, i.e., after all necessary procedures have been completed, the resulting image may be printed on a peripheral device 135 and/or displayed on the display device 130.

Figure 3:
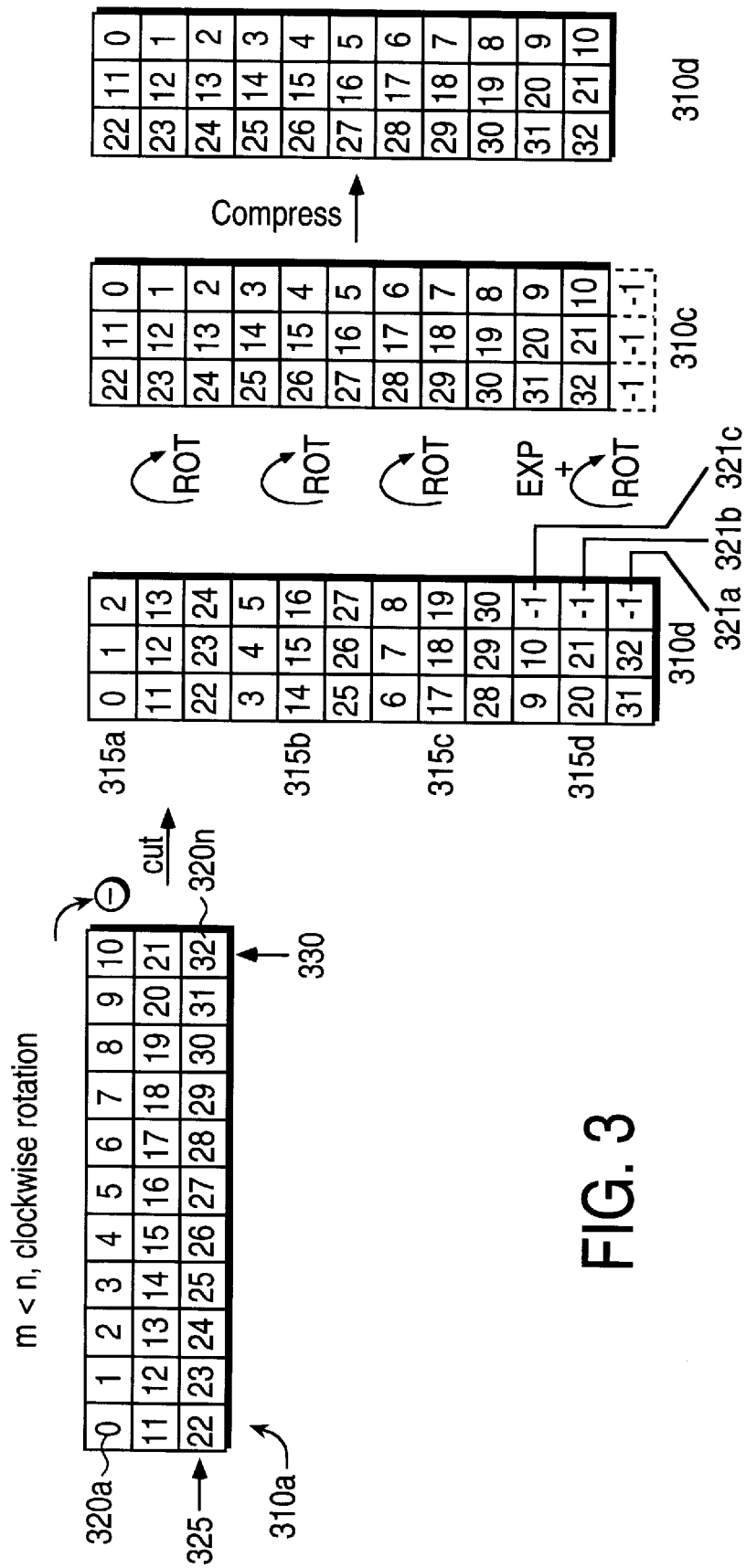
FIG. 3 illustrates one embodiment of rotating a landscape image in a clockwise direction in accordance with the present invention.

FIG. 3 is an illustration of one embodiment of rotating an image 310 from a landscape position 310a in a clockwise (or negative) direction to a portrait position to produce a rotated image 310d in accordance with the present invention. The image 310 includes pixels 320a–320n (generally 320 and numbered in the example from 0–32) that are aligned in rows 325 and columns 330.

Generally, pixels of the original landscape image 310a are rearranged by the cut module 225 into an intermediate portrait image 310b, composed of a plurality of superimposed sub-images 315a–315d (generally 315). The superimposed sub-images are generally equal size sub-images 315 and have a size of p pixels 320 by p pixels 320, where p in this case is equal to the number of rows 325, m. It is noted that the last of the sub-images 315d is a rectangle containing the remainder portion of pixels 320. Thus, the remainder portion is expanded by the square completion module 230 to add filler pixels 321a–321c (generally 321) so that the last sub-image 315d is also a square. It is noted that the filler pixels 321 are, in one embodiment, represented by memory cells that may be empty.

Once the sub-images 315 are obtained, the pixels 320 within each sub-image 315 are rotated separately by the rotation module 235 to produce the portrait image 310c. After rotation, the portrait image 310c is compressed by the compression module 245 to eliminate the filler pixels 321 that were inserted before the rotation process. After compression, the image produced is the final portrait image 310d, which is the second (rotated) position of the original image 310a.

Figure 4:
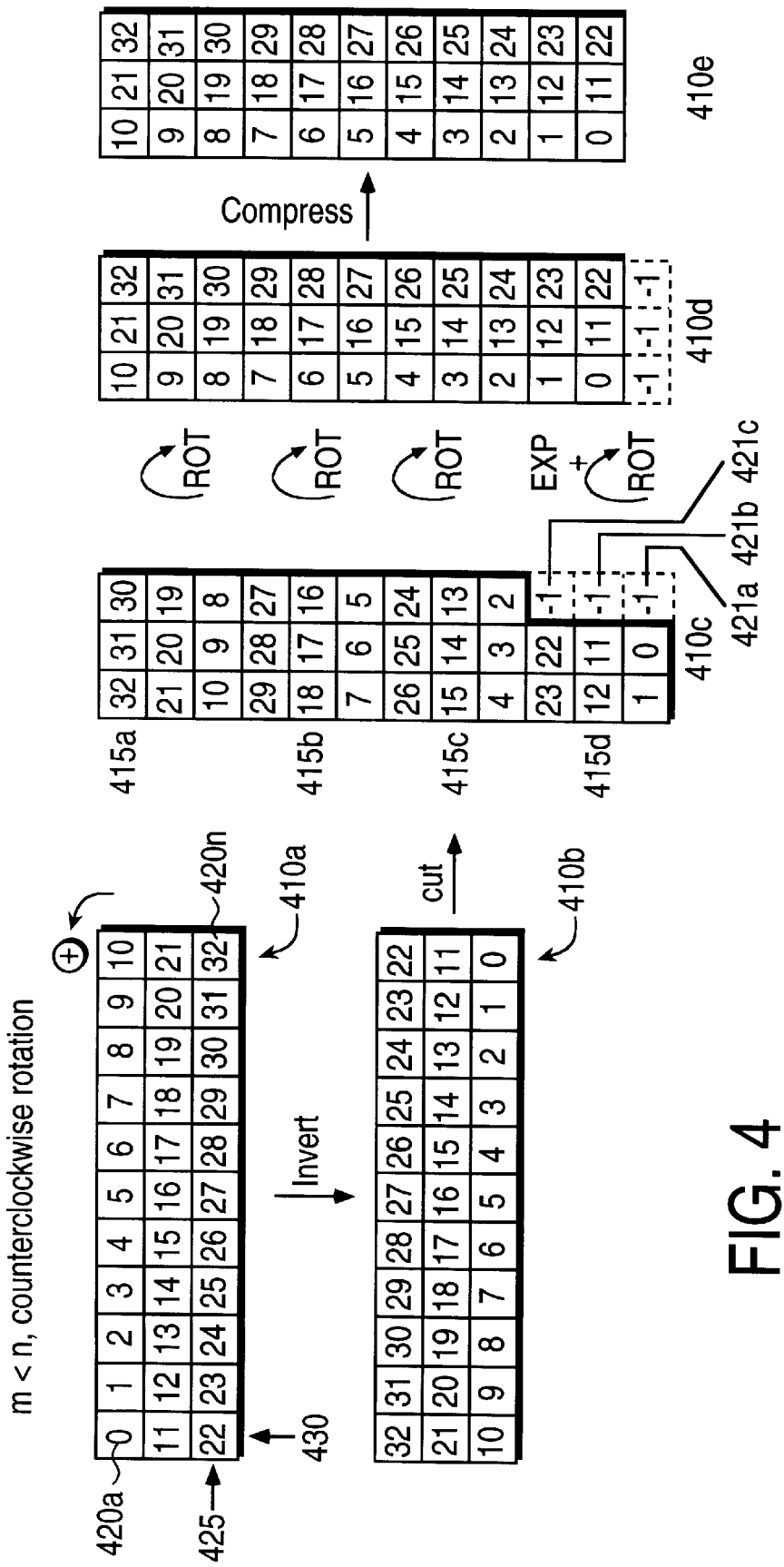
FIG. 4 illustrates one embodiment of rotating a landscape image in a counterclockwise direction in accordance with the present invention.

FIG. 4 is an illustration of one embodiment of rotating an original image 410a from a landscape position in a counterclockwise (or positive) direction to a portrait position to produce a rotated image 410e in accordance with the present invention. As for the image 310a described above, the image 410 includes pixels 420a–420n (generally 420 and numbered here 0–32) that are aligned in rows 425 and columns 430.

Generally, the original image 410a is first inverted, so that the last pixel (pixel 32) 420n is in a first position and the first pixel (pixel 0) 420a is in a last position. That is, the pixels 420 in each row 425 are placed in inverse order and the pixels 420 in each column 430 are placed in inverse order. It is noted that in a linear memory array representation of the image, it is sufficient to reverse the order of the pixels, as is further described below. The result of the inversion process is an inverted image 410b.

The inverted landscape image 410b is now rearranged, by the cut module 225 into an intermediate portrait image 410c, composed of a plurality of superimposed sub-images 415a–415d (generally 415). The equal size sub-images 415 have a size of p pixels 420 by p pixels 420, where p in this case is equal to the number of rows 425, m. It is noted that the last of the sub-images 415d is a rectangle containing the remainder portion of pixels 420. Thus, the remainder portion is expanded by the square-completion module 230 to add filler pixels 421a–421c (generally 421) so that the last sub-image 415d is also a square.

Once the sub-images 415 are obtained, the pixels 420 within each sub-image 415 are rotated by the rotation module 235 to produce the portrait image 410d. After rotation, the portrait image 410d is compressed by the compression module 245 to eliminate the filler pixels 321 and yield for output the final portrait image 410e, which is the second (rotated) position of the original image 410a.

Figure 5A:
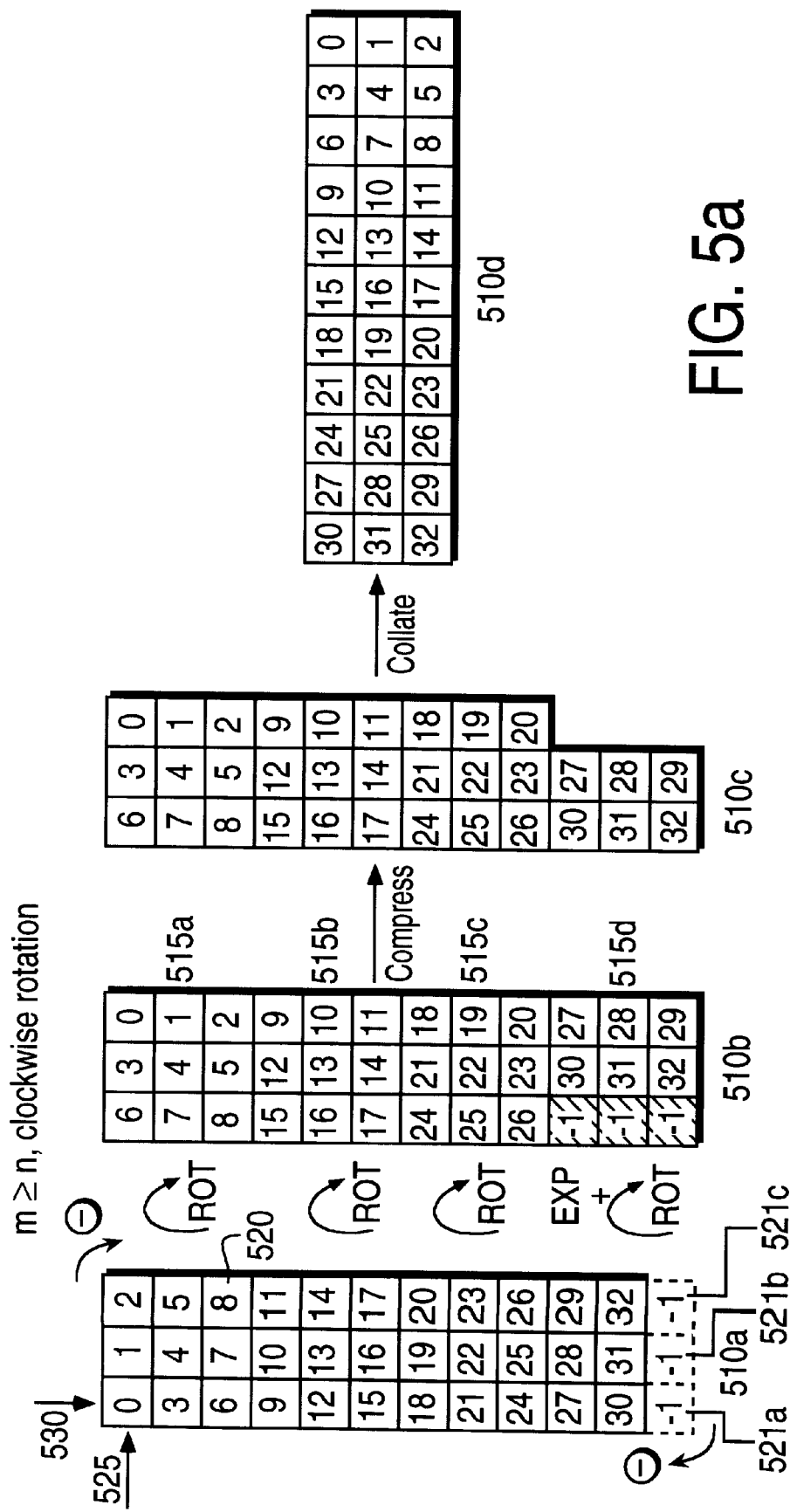
FIG. 5a illustrates one embodiment of rotating a portrait image in a clockwise direction in accordance with the present invention.

FIG. 5a is an illustration of one embodiment of rotating an original image 510a from a portrait position in a clockwise (or negative) direction to a landscape position to generate a rotated image 510d in accordance with the present invention. As for the image 310a described above, the image 510 includes pixels 520a–520n (generally 520 and numbered here 0–32) that are aligned in rows 525 and columns 530.

Being in the portrait position, the original image 510a is already composed of a plurality of superimposed sub-images 515a–515d (generally 515). In one embodiment, it may be considered that the image 510a is already cut, or partitioned, into sub-images 515a–515d (generally 515). The equal size sub-images 515 are of a size of p pixels 520 by p pixels 520, where p in this case is equal to the number of columns 530, n. It is noted that the last of the sub-images 515d is a rectangle containing the remainder portion of pixels 520.

Thus, the remainder portion is expanded by the square-completion module 230 to add filler pixels 521a–521c (generally 521) so that the last sub-image 515d is also a square.

After the remainder rectangle sub-image has been completed to a square, the pixels 520 within each sub-image 515 are rotated by the rotation module 235. The rotated image 510b is then compressed by the compression module 245 to remove the filler pixels 521, so that the portrait image 510c is produced. Finally, all the sub-images are collated together by the collation module 240 to produce for output the final landscape image 510d of the original portrait image 510a. It is noted that in an alternative embodiment, the image may be collated by the collation module 240 and then be compressed by the compression module 245.

Figure 5B:
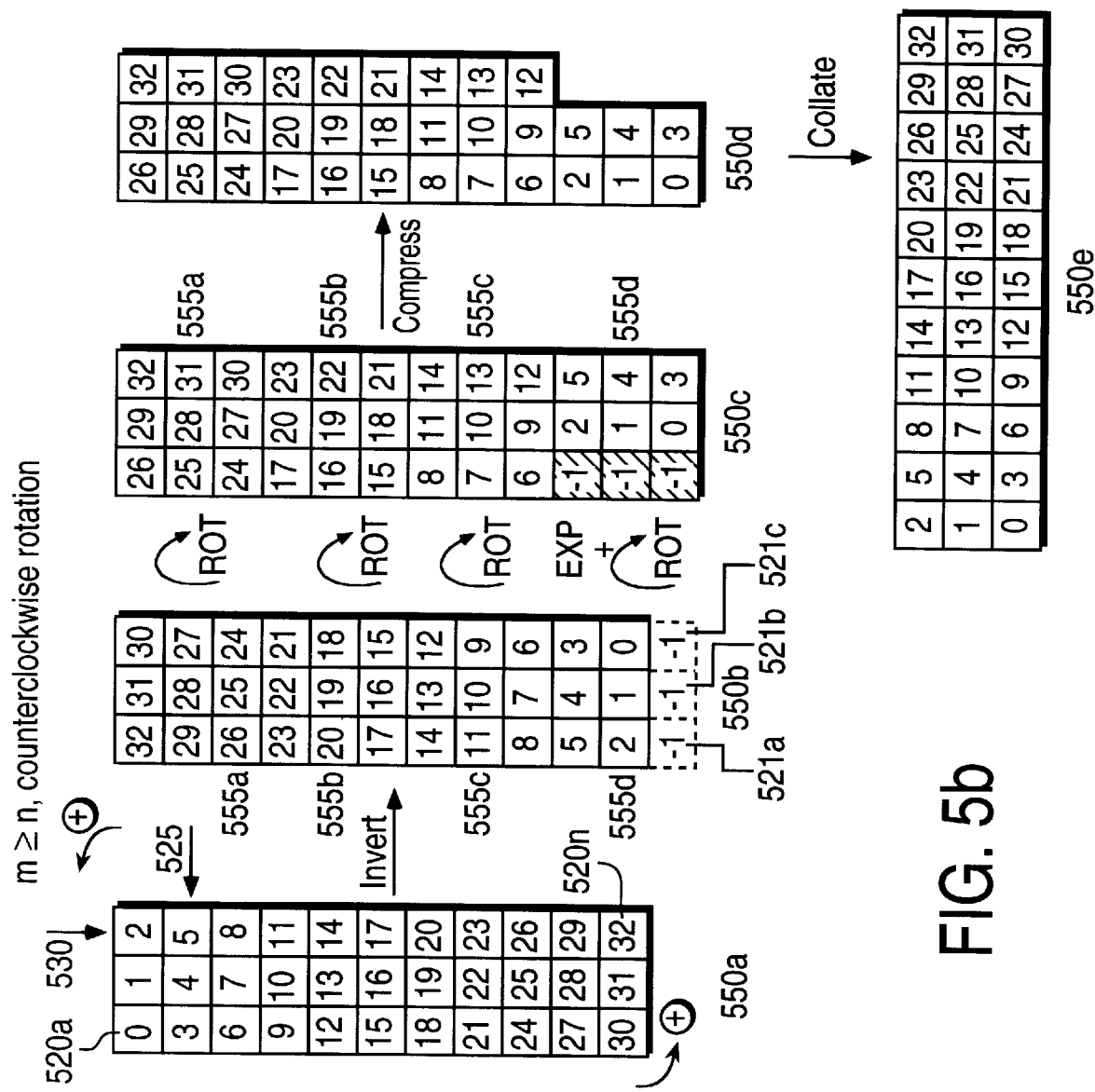
FIG. 5b illustrates one embodiment of rotating a portrait image in a counterclockwise direction in accordance with the present invention.

FIG. 5b is an illustration of one embodiment of rotating an original image 550a from a portrait position in a counterclockwise (or positive) direction to a landscape position to produce a rotated image 550e in accordance with the present invention. As for the image 510a described above, the image 550 includes the pixels 520a–520n (generally 520 and numbered in this example from 0–32) that are aligned in the rows 525 and the columns 530 as described above in FIG. 5b.

Generally, the original image 550a is first inverted, so that the last pixel (32) 520n is in a first position and the first pixel (0) 520a is in a last position. That is, the pixels 520 in each row 525 are placed in inverse order and the pixels 520 in each column 530 are placed in inverse order. The result is an inverted image 550b.

Being in the portrait position, the image 550b is already composed of a plurality of superimposed sub-images 555a–555d (generally 555). As discussed above, in one embodiment it may be considered that the image 550b is already cut or partitioned into sub-images 555a–555d (generally 555). The equal size sub-images 555 are of a size of p pixels 520 by p pixels 520, where p in this case is equal to the number of columns 530, n. It is noted that the last of the sub-images 555d is a rectangle containing the remainder portion of pixels 520. Thus, the remainder portion is expanded by the square-completion module 230 to add filler pixels 521a–521c (generally 521) so that the last sub-image 555d is also a square.

After the remainder rectangle sub-image has been completed to a square, the pixels 520 within each sub-image 555 are rotated by the rotation module 235. The rotated image 550c is compressed by the compression module 235 to remove the filler pixels 521, so that the portrait image 550d is produced. The sub-images are collated together by the collation module 240 to produce for output the final landscape image 550e of the original portrait image 550a. It is noted that in an alternative embodiment, the image may be collated by the collation module 240 and then be compressed by the compression module 245.

Figure 6A:
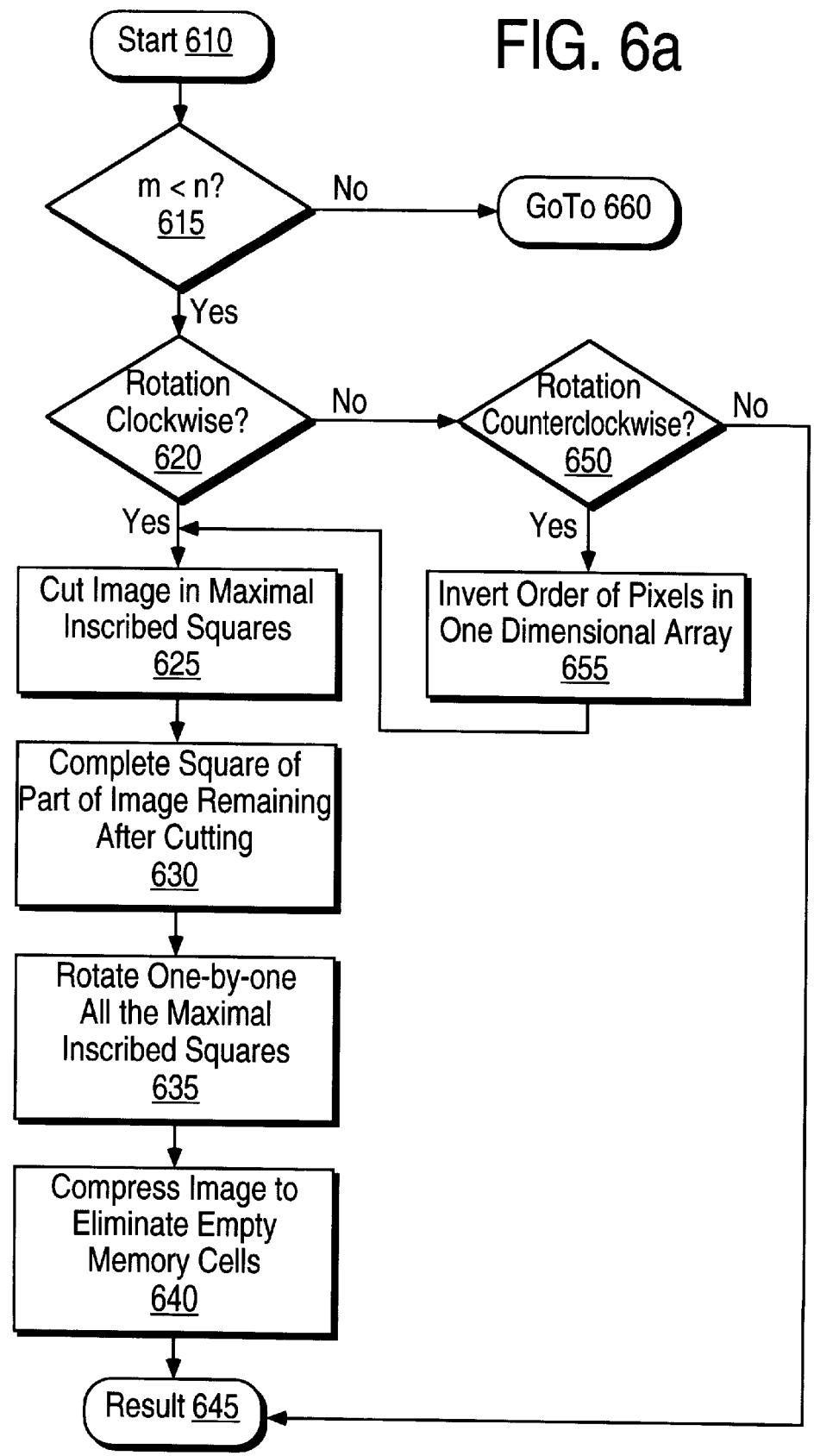
FIGS. 6a and 6b are flow diagrams of one embodiment of generally rotating an image in accordance with the present invention.
Figure 6B:
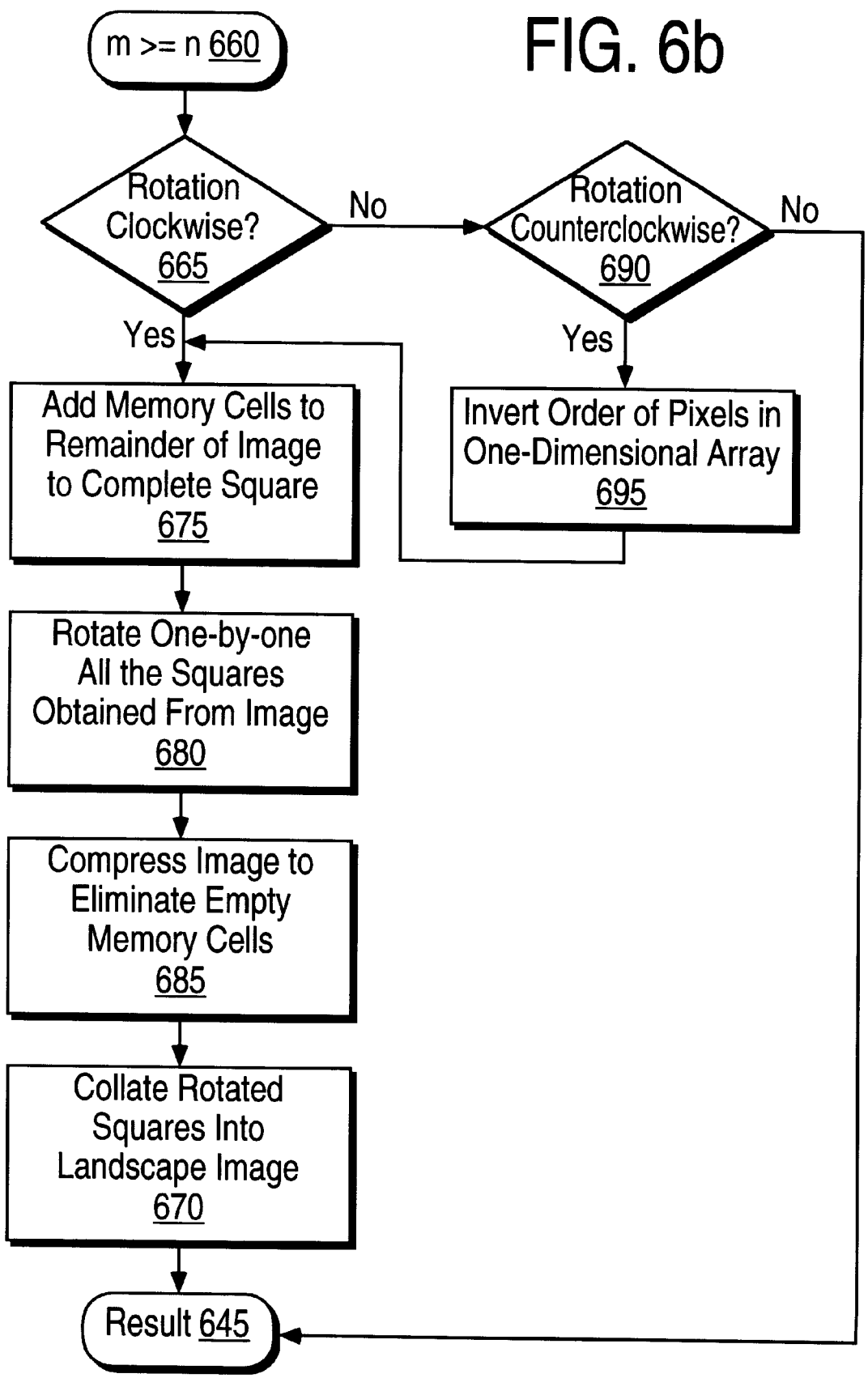

FIGS. 6a and 6b are flow diagrams of one embodiment of generally rotating an image in accordance with the present invention. The flow diagrams of FIGS. 6a and 6b illustrate, for example, the rotations described above in FIGS. 3, 4, 5a, and 5b.

The process starts 610 with the image rotation system 210 receiving an image. In one embodiment the image includes, for example, a plurality of pixels where the pixels are arranged in a number of pixel rows, m, and pixel columns, n, where m and n are integer values. The orientation unit 220 determines 615 whether the number of pixel rows, m, is greater than or equal to the number of pixel columns, n. If m is greater than n, the image is in a portrait position and will be rotated into a landscape position as described, for example, in the second case (beginning at 660). A square image (e.g., m=n) can be processed either as a portrait or as a landscape image. The flow diagram in FIGS. 6a and 6b conveniently defines a square image (e.g., m=n) to be in a portrait position. Note that collation module 240 is not needed in this case. Moreover, the only module, within the rotation system 210, needed to rotate the image, is the rotation module 235.

The orientation unit 220 is also used to determine how the image will be partitioned into sub-images. Each sub-image may be a square of either m*m if m is less than n, or n*n if n is less than m.

If m is less than n, the image is in a landscape position and will be rotated into a portrait position. In this case the orientation unit 220 also determines 620 whether the image will be rotated in the clockwise direction. If the orientation unit 220 determines 620 that the image will not be rotated in a clockwise direction, it determines 650 whether the image will be rotated in a counterclockwise direction. If the rotation is not counterclockwise either, the result 645 is that the process ends. If the rotation is in a counterclockwise direction, the order of the pixels is inverted 655 as illustrated above in FIG. 4 and as further described below. If the image is rotated clockwise no such inversion processing involving the order of the pixels is required.

Once the sign of the rotation of the image is determined 620, 650 and any applicable inversion processing completed 655, the cut module 225 calculates and cuts 625 (e.g., partitions or divides) the image into maximal inscribed squares, each forming a sub-image of the original image. It is noted that these sub-images are of a size q pixels by q pixels (i.e., q×q), where q is an integer value. The orientation unit 220 determines the value of q, by comparing the value of m to n and equating q to the lesser value. Assuming that m<n, we have q=m.

When the cut module 225 partitions the image into one or more maximal inscribed square sub-images and a rectangular sub-image remainder, the square completion module 230 inserts filler pixels so that the remainder rectangular sub-image becomes, or completes 630, a square. In one embodiment, the filler pixels are taken from empty cells in the memory 115. They are associated to the image that is already being processed in the memory 115.

Once the image has been cut into sub-images and the remainder completed into a full square, the rotation module 235 rotates 635 the pixels within each sub-image. This rotation of the pixels, in effect, completes the rotation of the image in the direction desired. The compression module 245 of the image rotation system 210 removes 640 the filler pixels from the rotated image before ending the process by producing a result 645 that is the rotated image in the portrait position. Note that all filler pixels are found in a compact sequence at the end of the linear array representing the image, which can be de-allocated immediately.

If the number of rows, m, is not less than the number of columns, n, (that is, m is greater than or equal to n (660)) the image rotation process first determines 665 whether the rotation of the image will be in a clockwise direction. If the orientation unit 220 determines 665 that the image will not be rotated in a clockwise direction, it determines 690 whether the image will be rotated in a counterclockwise direction. If the rotation is not counterclockwise either, the result 645 is that the process ends. If the rotation is in a counterclockwise direction, the order of the pixels is inverted 695 as illustrated above in FIG. 6b and as further described below. If the image is rotated clockwise no such inversion processing involving the order of the pixels is required.

The original image being in the portrait position, there is no need to cut it, once the rotation of the pixels is determined 665, 690 and any applicable inversion processing completed 695. In fact, the image is already partitioned or "cut" into superimposed maximal inscribed squares of equal size and, possibly, the remainder rectangular portion. When the image is in the portrait position, its maximal inscribed square sub-images and, possibly, the remainder rectangular sub-image are defined by compact sequences of adjacent pixels in the linear memory array representation of the image, which is further described below. Therefore, each of these sub-images can be rotated immediately by the rotation module 235.

It is noted that these sub-images are of a size q pixels by q pixels (i.e., q×q), where q is an integer value as described above. Assuming that m is greater than or equal to n, in this case q=n. An image partition into maximal inscribed square sub-images, however, may yield a remainder portion that is not a square. Note that the maximal inscribed square sub-images (and possibly the remainder rectangular sub-image) are identified in a portrait image by counting the pixels in its one dimensional representation. Therefore, the portrait image is partitioned without help of the cut module 225. Sub-image identification by pixel counting is performed by the rotation module 235.

In addition, it is noted that use of words "cut" and "partition" may denote a particular sub-image identification in which the pixels of the one dimensional image representation are rearranged to produce compact sequences of pixels corresponding to each of the sub-images. Further, the word "partition" may also be used in a more generic sense to denote both sub-image identification by: (1) pixel counting, and by (2) rearrangement of pixels to produce compact sequences of pixels corresponding to each of the sub-images in the one dimensional image representation.

When the image partition into one or more maximal inscribed square sub-images comprises a rectangular sub-image remainder, the square completion module 230 inserts, or adds 675, filler pixels so that the sub-image becomes a square. In one embodiment, the filler pixels are empty cells in the memory 115. They are associated with the image that is already being processed in the memory 115.

Once the image remainder portion has been completed to a full square, the rotation module 235 rotates 680 the pixels within each sub-image. The compression module 245 in the image rotation system 210 removes 685 the filler pixels from the rotated image by pushing the pixels of this rotated image to their leftmost position. This leaves filler pixels in a compact sequence at the end of the linear memory array representing the image. As the total number of filler pixels is known, this port of the linear memory array is de-allocated. All the sub-images are then collated 670 together to generate the rotated landscape image of the original portrait image. This result 645 is an end of the rotation procedure.

The images illustrated in FIGS. 3, 4, 5a, and 5b and further described in FIGS. 6a and 6b, are stored in memory 115 as a linear array of pixels. Thus, the process for rotating an image in the image rotation system can be illustrated through the linear array of pixels, as is further described below.

Figure 7A:
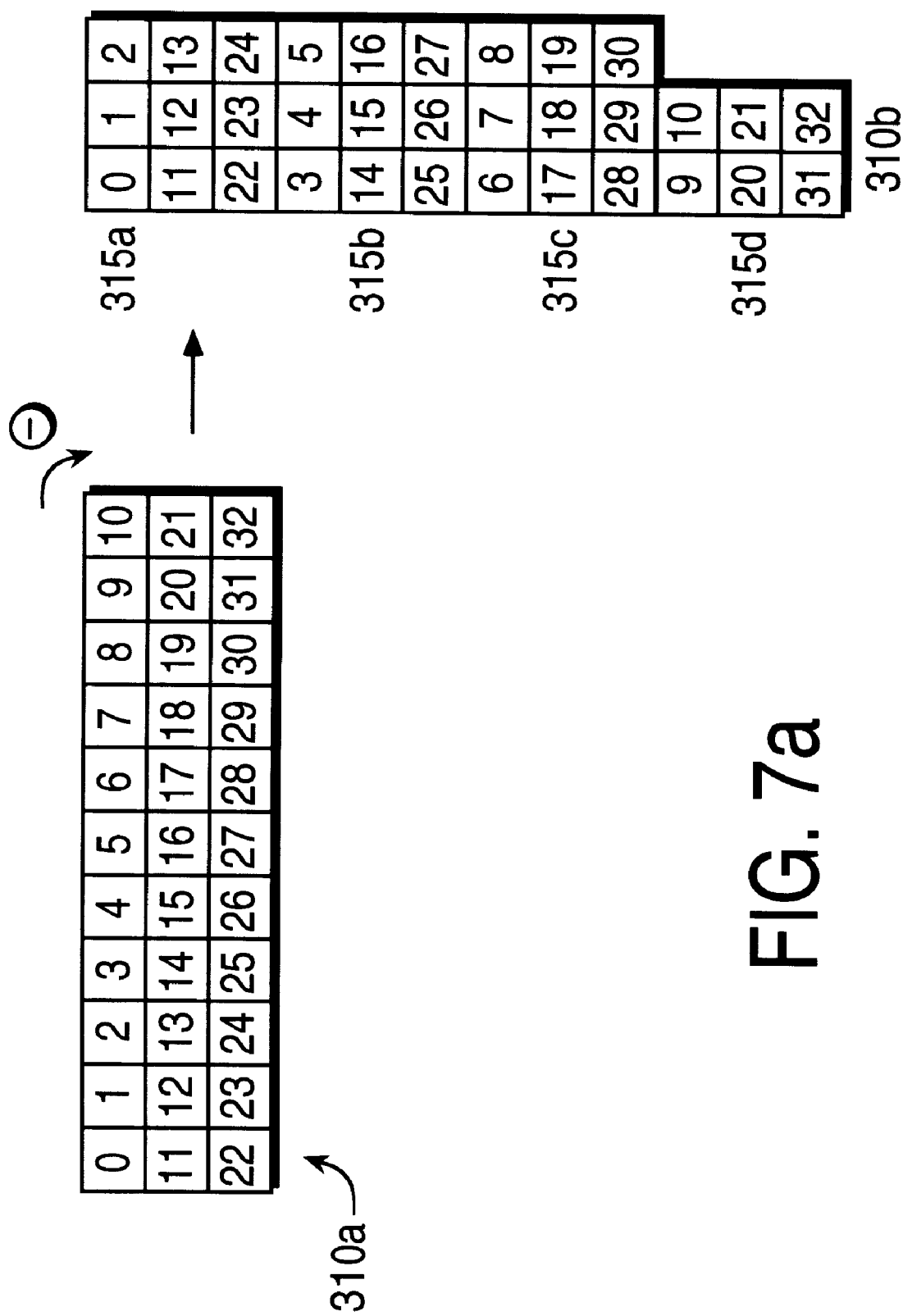
FIG. 7a illustrates one embodiment of pre-processing a landscape image, represented as a two-dimensional array by cutting the image in accordance with the present invention.

FIG. 7a illustrates one embodiment of a two-dimensional representation of the original image and a two-dimensional representation of the image resulting from the process of cutting the image. For illustration and example purposes, the original image 310a in FIG. 3 and the rearranged (cut) image 310b in FIG. 3 are illustrated again in FIG. 7a. With the corresponding arrangement of pixels in the linear memory array, the image 310b is ready for further processing by the rotation module 235.

As in FIG. 3, the rearranged portrait image in FIG. 7a illustrates also the sub-images 315 obtained by the cutting process. The pixels of these sub-images, ordered lexicographically, are represented in a linear memory array by sequences of adjacent pixels so that all the pixels belonging to one sub-image are mapped in a single sequence of adjacent pixels. It is noted that the sub-images are represented by compact sequences of pixels in the linear memory array.

Figures 4, 7B:
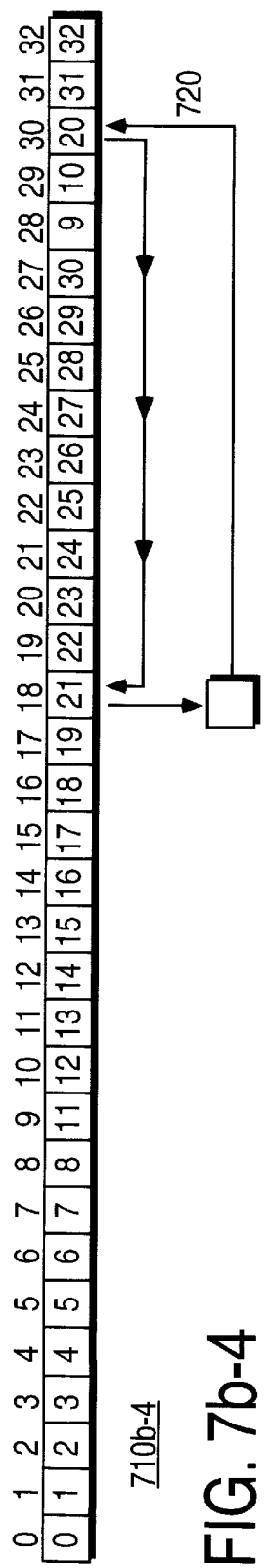
Figures 5, 7B:
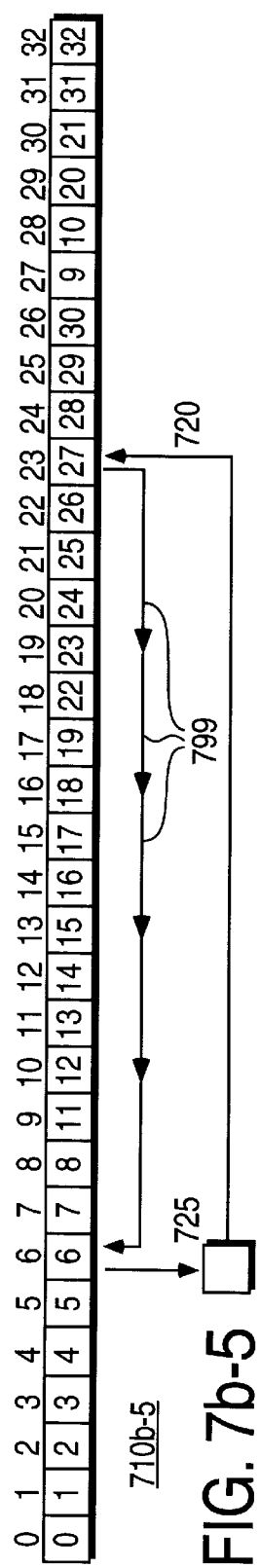
Figures 6, 7B:
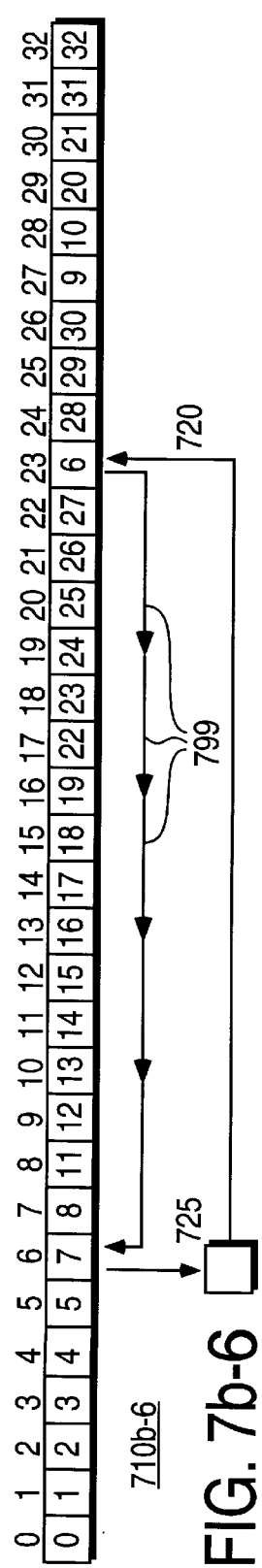
Figures 7, 7B, 8, 9, 10, 11, 12, 13, 14, 15, 16:
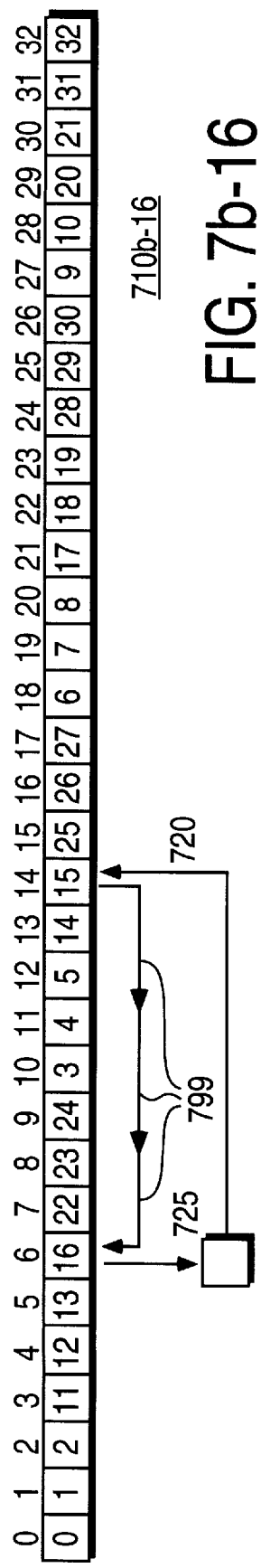
Figure 7C:
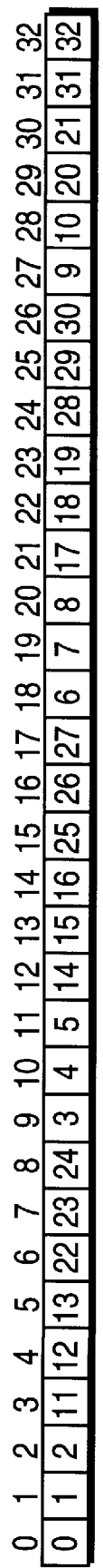
FIG. 7c illustrates one embodiment of a one-dimensional memory array representation of an image after rearranging the image by cutting the image in accordance with the present invention.

In FIG. 7a, the original image has m=3 pixel rows and n=11 pixel columns. FIGS. 7b and 7c are linear array pixel processing diagrams of one embodiment of rearranging the original landscape image 310a into a portrait image 310b by the cut module 225 in accordance with the present invention.

Also, for example and illustration purposes only, FIG. 7b-1 illustrates the linear memory array 710 representation of the original image 310a. The linear memory array 710 is located in the memory 115. The linear memory array 710 includes one or more fixed memory cell locations 715a–715q (generally 715), where q is a location for the last pixel. Each memory cell location in this example is identified by a memory cell location number 0 through 32. Each memory cell location 715 includes a pixel 320 from the original image 310a, where the pixels 320 correspond to their location in the actual, two-dimensional visualized original image 310a.

As discussed above, once the orientation unit 220 determines the orientation of the original image 310a (landscape in this example) and the direction of rotation (clockwise in this example), the cut module 225 cuts the image into sub-images as described above (3×3 pixel 320 sub-images 315 in this example). To cut the original image of three pixel 320 rows by eleven pixel 320 columns, the pixels 320 in the linear memory array 710 must be appropriately re-arranged in the memory 115.

It is noted that the pixels 320 of the two-dimensional array representation 310a, for example, the landscape image, are arranged in lexicographical order in the one-dimensional, or linear, array representation 710b-1 of that same image. The result of the cutting process is a portrait image with the two-dimensional array representation 310b. The lexicographical order of pixels 320 in the image 310b yields the linear array representation 710c. The process of re-arrangement of the linear array representation 710b-1 into the linear array representation 710c is described through FIGS. 7b-1 to 7b-16. It is noted that in a preferred embodiment, lexicographical ordering is always used so that there is a one-to-one correspondence between a two-dimensional array and a one-dimensional, or linear, array representation of an image.

The cut module 225 of the image rotation system 210 begins to process the pixels 320 from the remainder portion of the last sub-image 315d and works through each sub-image in reverse order (315c, 315b, 315a). Initially, the cut module 225 determines what pixels 320 are in the remainder portion of the last sub-image 315d and these pixels 320 are suppressed and moved toward the end of the linear array 710b-1. In this example, the remainder portion in the last sub-image 315d includes pixel numbers 9, 10, 20, 21, 31, and 32.

To suppress the pixels 320 in the remainder portion, the cut module 225 marks an insertion point 720 (by memory cell location 30 in this example) for the suppressed pixels 320 just before memory cell location 31, which is where pixel number 31 is located. This insertion point 720 is considered an entry point because pixel numbers 31 and 32 are already at the end of the linear memory array 710. The cut module 225 then marks memory cell location 9 from which all the pixels belonging to the first row of the last sub-image 315 can be pushed through to the insertion point 720 (by memory cell location 30 in this example). The cut module 225 provides an empty temporary memory cell 725 from the memory 115 to which the cut module 225 writes out pixel number 9 from memory cell location 9.

After writing out pixel number 9 to the empty temporary memory cell 725, the cut module 225 performs a shift function where pixel number 10 is shifted to memory cell location 9 (this shift and subsequent shifts in FIGS. 7b-1 to 7b-16 are illustrated through the repeated arrows 799). With memory cell location 10 open, pixel number 11 is shifted into memory cell location 10. With memory cell location 11 now open, pixel number 12 is shifted into memory cell location 11. Each subsequent pixel up to, and including, the pixel in the entry point (memory cell location 30 having pixel number 30) is similarly shifted. It is noted that in one embodiment the shift 799 may be performed by a shift register function.

By shifting pixel number 30 to memory cell location 29, there is now an empty space at memory cell location 30. The pixel number 9, which is in the temporary memory cell 725, is now inserted by the cut module 225 into the memory cell location 30 and the linear memory array 710 is as illustrated in FIG. 7b2.

In addition to moving pixel 9, pixel 10 must also be moved to before the insertion point 720 in the linear array 710b-2. As with pixel 9, the cut module 225 provides an empty temporary memory cell 725 from the memory 115 to which the cut module 225 writes out pixel number 10 from memory cell location 9. It is noted that the memory cell location 9, from which pixels 9 and 10 were taken, has not changed. Once pixel 10 is written to the temporary memory cell 725, the pixels 11 through 9 that are in memory cell locations 10 through 30, respectively, are shifted 799 up one memory cell location. Specifically, the pixels at these locations are shifted to the preceding memory cell location, similar to the way described above with respect to the shift after writing out pixel 9.

With memory cell location 30 now open, pixel 10 is written from the temporary memory cell 725 to the memory cell location 30 by the cut module 225. Now, pixels 9 and 10 are in memory cell locations 29 and 30, respectively, and the linear memory array 710 is as shown in FIG. 7b-3.

Once pixels 9 and 10 are pushed to the end of the linear array 710b-3, pixels 20 and 21 are also pushed to the end of the linear array in a similar manner. That is, the cut module 225 marks the memory cell location 18, which contains the first pixel 20 of the next row of the sub-image 315d. The insertion point remains the same; it changes only with the change of the sub-image being processed. The cut module 225 then places pixel 20 from memory cell location 18 into the empty temporary memory cell 725. With memory cell location 18 open, pixels 21 through 10 that are in subsequent memory cell locations 19 through 30 respectively, are shifted 799 up by one memory cell location to the preceding memory cell location, as described above. These shifts 799 result in the memory cell location 30 being open. The cut module 225 places pixel 20 into the open memory cell location 30, so that the linear memory array 710 is now as illustrated in FIG. 7b-4.

Similarly, the cut module 225 writes out pixel 21 from memory cell location 18 to the now empty temporary memory cell 725. Again, the pixels in memory cell locations 19 through 30 are shifted up one memory cell location to the preceding memory cell location so that memory cell location 30 is open. The cut module 225 writes out pixel 21 from the temporary memory cell 725 to the open memory cell location 30. The linear memory array 710 is now as illustrated in FIG. 7b-5. Thus, the pixels 9, 10, 20, 18 21, 31, 32, which are the pixels in the remainder portion that forms the last sub-image 315d, are now pushed to the end of the linear memory array 710.

Once the last sub-image 315d is processed, the image rotation system 210 processes the next sub-image 315c in reverse order. As with the last sub-image 315c, the cut module 225 identifies and marks an insertion point 720 for the suppressed pixels 320. The insertion point 720 moves from memory cell location 30, just before memory cell location 31, to memory cell location 23, just before memory cell location 24, which is where pixel number 28 is located. This point 720 is considered an entry point because pixel numbers 28, 29, and 30 are already in the proper memory cell locations in the linear memory array 710. Moreover, these pixels mark where this sub-image 315c ends. The cut module 225 then marks the memory cell location 6 from which all the pixels 320 belonging to the first row of the next-to-last sub-image 315c can be pushed through to the insertion point 720 (memory cell location 23 in this example).

Once the insertion point 720 is marked for the sub-image 315c, the cut module 225 shifts the pixels 320 in this sub-image 315c within the linear memory array 710, functionally the same way as the pixels 320 (pixels 9, 10, 20, 21) in the last sub-image 315d. Specifically, the pixels 320 that must be re-arranged in the linear memory array 710 for this sub-image 315 are pixels 6, 7, 8, 17, 18, and 19.

In particular, pixel 6 is written out from memory cell location 6 to the temporary memory cell 725. The pixels in subsequent memory cell locations 7 through 23 are shifted 799 up one memory cell location so that memory cell location 23 is open. The cut module 225 then writes out the pixel from the temporary memory cell 725 to the open memory cell location 23. The linear memory array 710 is now as illustrated in FIG. 7b-6.

Similarly, the content of memory cell location 6 (pixel 7 in this example) is again saved in the temporary memory cell 725 by the cut module 225. The pixels in subsequent memory cell locations 7 through 23 are shifted 799 as described above and pixel 7 is written from the temporary memory cell 725 to the now open memory cell location 23. The linear memory array 710 is now as illustrated in FIG. 7b-7. The process is functionally the same for pixel 8 which is now in memory cell location 6. That is, the cut module 225 writes out pixel 8 to the temporary memory cell location 725. The pixels in the subsequent memory cell locations 7 through 23 are shifted 799 as described above and pixel 8 is written out from the temporary memory cell 725 to the now empty memory cell location 23. The result is a linear memory array 710 as illustrated in FIG. 7b-8.

The next set of pixels 17, 18, and 19 are shifted from memory cell location 12 to memory cell location 23 in a functionally similar process as with pixels 6, 7, and 8. That is, the cut module 225 marks the memory cell location 12, which contains the first pixel, 17, of the next row of the next to the last sub-image 315c. The insertion point 720 remains the same; as mentioned above, the location of the insertion point 720 changes with the change of the sub-image being processed. The pixels 17, 18, and 19 are then moved from memory cell location 12 to memory cell location 23, and the linear memory array is illustrated in FIGS. 7b-9, 7b-10, and 7b-11 after the respective pixels have been shifted 799. Thus, after pixels 17, 18, and 19 have been shifted, the second to last sub-image 315c is completed with pixels 6, 7, 8, 17, 18, 19, 28, 29, and 30 in the respective memory cell locations 18 through 26 in the linear memory array 710.

Once the second to last sub-image 315c is arranged within the linear memory array 710, the image rotation system 210 processes the third to last sub-image 315b as illustrated in FIG. 7b-11. As with the previous two sub-images 315d, 315c, the cut module 225 identifies and marks a new insertion point 720 for this sub-image 315b. The insertion point 720 moves from memory cell location 23 (just before memory cell location 24) to memory cell location 14 (just before memory cell location 15) which is where pixel number 25 is located. This insertion point 720 is considered an entry point because pixel numbers 25, 26, and 27 are already in the proper memory cell locations within to linear memory array 710 which is where this sub-image 315b ends. The cut module 225 then marks the cell 3 from which all the pixels 320 belonging to the first row of the third to last sub-image 315b can be pushed through to the insertion point 720.

A first set of pixels, specifically pixels 3, 4, and 5, is moved from memory cell location 3 to memory cell location 14 in similar manner as the pixels (9, 10, 20, 21, 6, 7, 8, 17, 18, and 19) in the previous two sub-images 315d, 315c were moved. That is, pixels 3, 4, and 5 are moved from memory cell location 3 to memory cell location 14, and the linear memory array 710 is illustrated in FIGS. 7b-12, 7b-13, and 7b-14 after the respective pixels have been shifted 799.

The processing steps involving pixels 3, 4, and 5 are repeated for pixels 14, 15, and 16 as each of these pixels is moved, one after another, from memory cell location 6 to memory cell location 14. It is noted that the cut module 225 has marked the new memory cell location, 6, the contents of which are saved in the temporary memory cell 725. The insertion point 720, however, does not change. The linear memory array 710 is illustrated in FIGS. 7b-15, 7b-16, and 7c, respectively, after pixels 14, 15, and 16 are moved. Moreover, FIG. 7c illustrates the linear memory array 710 having the pixels 320 aligned in the proper order so that the respective sub-images 315a, 315b, 315c 315d are initially rearranged (cut or partitioned). The arrangement of the pixels 720 in FIG. 7c is a lexicographic order of pixels in a two-dimensional image illustrated in FIG. 3 after cutting 310b.

Figure 8A:
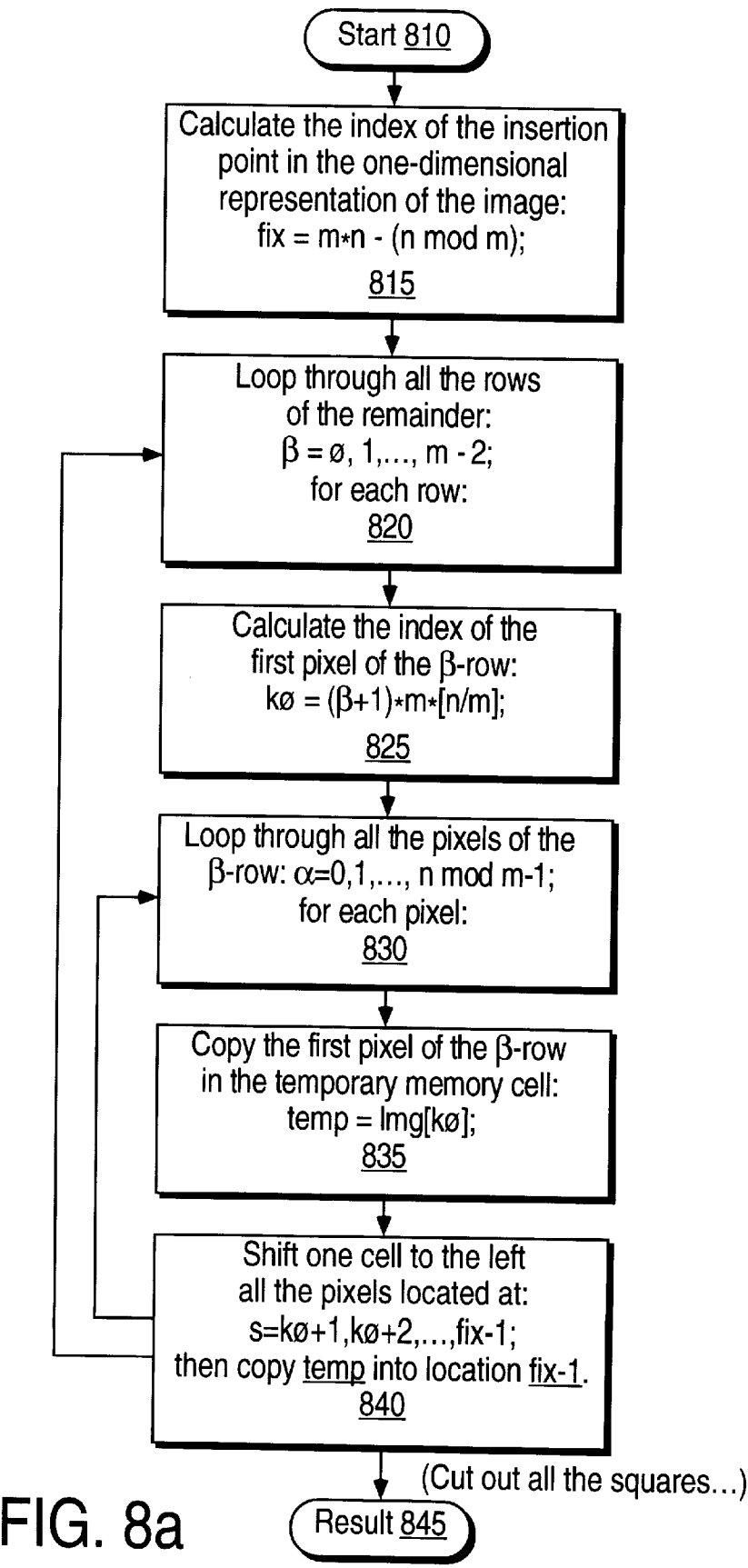
FIGS. 8a and 8b are flow diagrams of one embodiment of rearranging an image by cutting the image in accordance with the present invention.
Figure 8B:
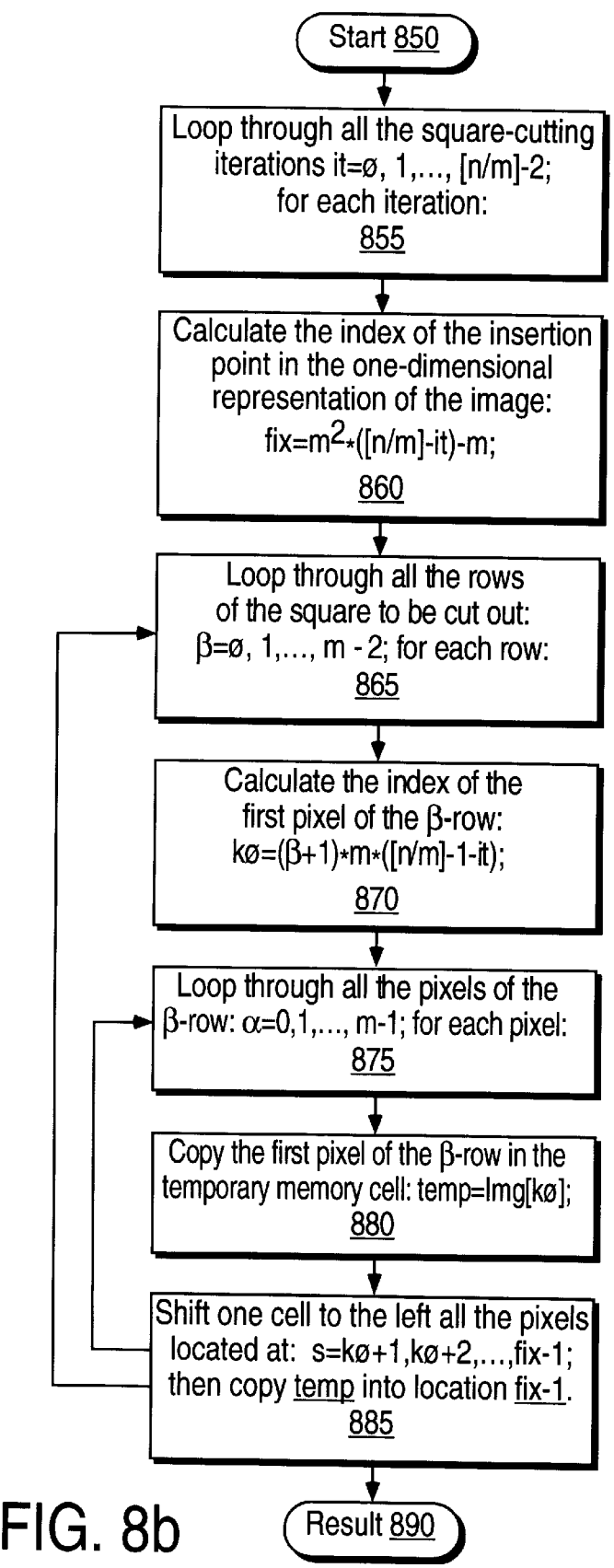

FIGS. 8a and 8b are flow diagrams of one embodiment of cutting an image into sub-images or maximal inscribed squares in accordance with the present invention. The cut module 225 of the image rotation system 210 starts 810 the process by identifying and rearranging the remainder rectangular sub-image when it exists (in FIGS. 3 and 7a the remainder is sub-image 315d). The process calculates 815 an index of the insertion point, e.g. insertion point 720, in the one-dimensional representation of the image, e.g., the linear memory array 710 of the image 310. Specifically, the process calculates the index of the insertion point 720 to be {fix=m*n−(n mod m)}, where fix is the location in the linear memory array 710 of the insertion point 720, m is the number of pixel rows, and n is the number of pixel columns.

After calculating the index of the insertion point 720, the process loops 820 through all of the rows 325 of the remainder using, for example, a running loop index {β=0, 1, ..., m−2}. For each row the process calculates 825 the index of the first pixel of the β row, specifically, {κφ=(β+1)*m*[n/m]}, where [n/m] denotes the maximal integer value that is not greater than n/m.

The process next loops 830 through all of the pixels 320 of the β row, where the running parameter for the inside loop is, for example, {α=0, 1, ..., n mod (m−1)}, and where a mod b denotes the integer remainder of the division, a/b. For each pixel, the process continues by copying 835 the first pixel of the β row to the temporary memory cell location 725, for example, {temp=Img[κφ]}. Then, the process shifts 840 (e.g., shifting 799) by one memory cell location 715 to the left all the pixels 320 located at a position identified at {s=(κφ+1), (κφ+2), ..., (fix−1)}. Once the pixels 320 are shifted, the pixel in the temporary memory cell location 725, temp, is copied into the location identified by (fix−1).

The image rotation system 210 continues in FIG. 8b with the process cutting all the complete square sub-images in reverse order beginning with the last complete square sub-image, e.g., 315c. The image rotation system 210 starts 850.

The process loops 855 through all of the square cutting iterations, where the iterations are, for example, {it=0, 1, ..., ([n/m]−2)}. For each iteration, the process calculates 860 the index of the insertion point 720 in the one-dimensional representation of the image, e.g., the linear memory array 710 of the image 310. The index of the insertion point 720 is identified by {fix=m$^2$*([n/m]−it)−m}, where fix is the location of in insertion point 720 for this iteration (or sub-image cut) in the linear memory array 710.

The process loops 865 through each row 325 of the sub-image 315 (or maximal inscribed square) using, for example, a running loop parameter {β=0, 1, ..., m−2} similar to one described above. The process calculates 870 the index of the first pixel of the β row, specifically, {κφ=(β+1)*m*([n/m]−1−it)}.

In a way similar to that described above, the process loops 875 through all of the pixels 320 of the β row, where the running parameter for the inside loop is, for example, {α=0, 1, ...(m−1)}. For each pixel, the process copies 875 the first pixel of the β row to the temporary memory cell location 725, for example, {temp=Img[κφ]}. Then, the process shifts 885 (e.g., shifting 799) by one memory cell location 715 to the left all the pixels 320 located at a position identified at {s=(κφ+1), (κφ+2), ..., (fix−1)}.

Once the pixels 320 are shifted, the pixel in the temporary memory cell location 725, temp, is copied into the location identified by (fix−1). The result 890 is that the process rearranges or cuts out, the original image 310 into the sub-images 315.

Figure 9A:
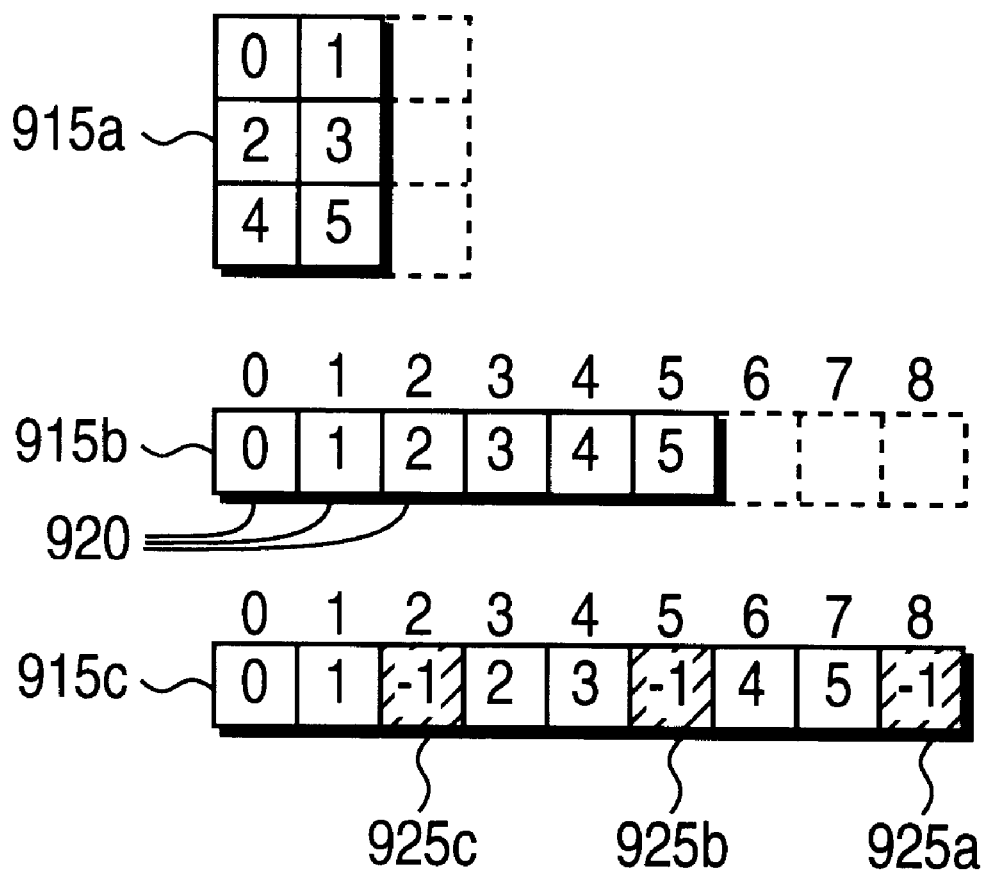
FIGS. 9a and 9b illustrate two examples of one embodiment for completing a square for a remainder sub-image in accordance with the present invention.
Figure 9B:
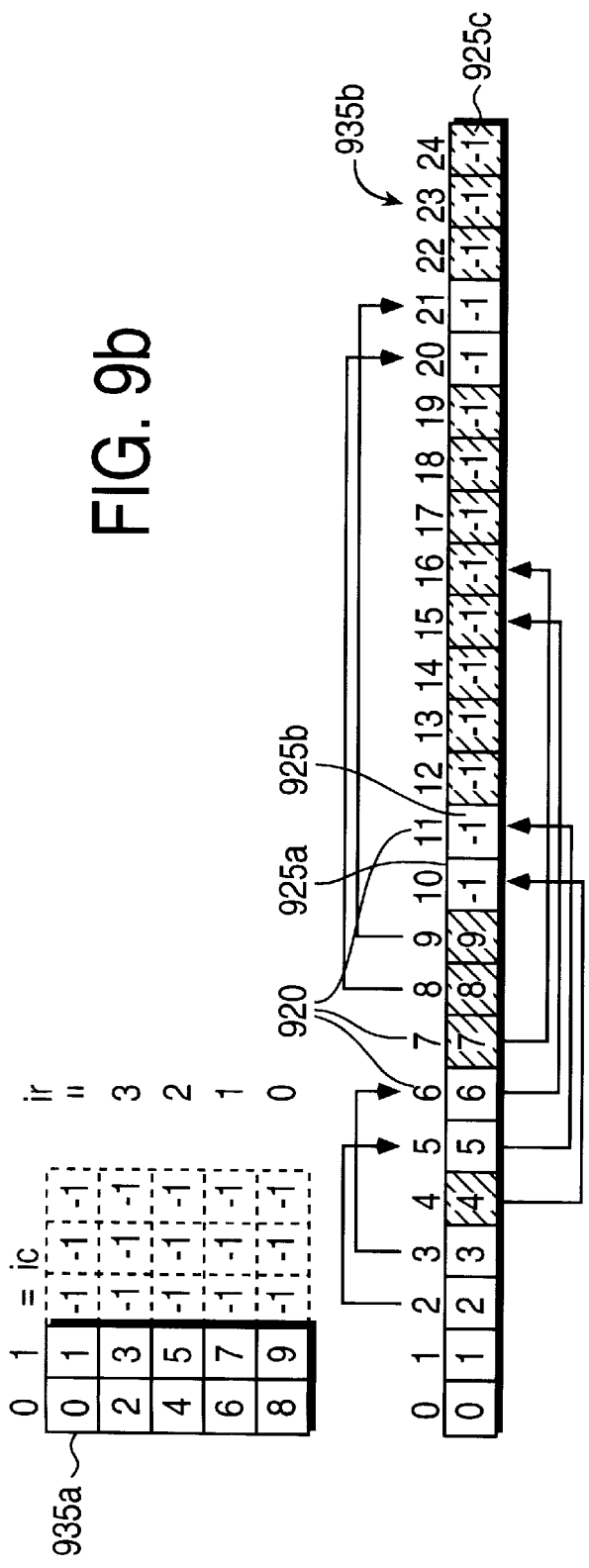
Figure 9C:
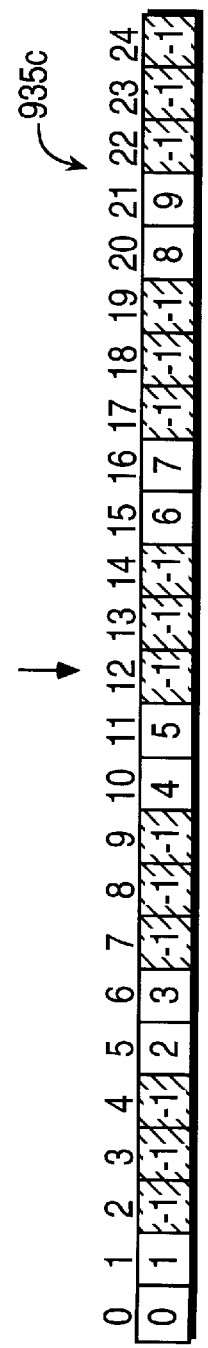
FIG. 9c illustrates one embodiment of a linear memory array representation of a two-dimensional image, and square completion, in accordance with the present invention.
Figure 10:
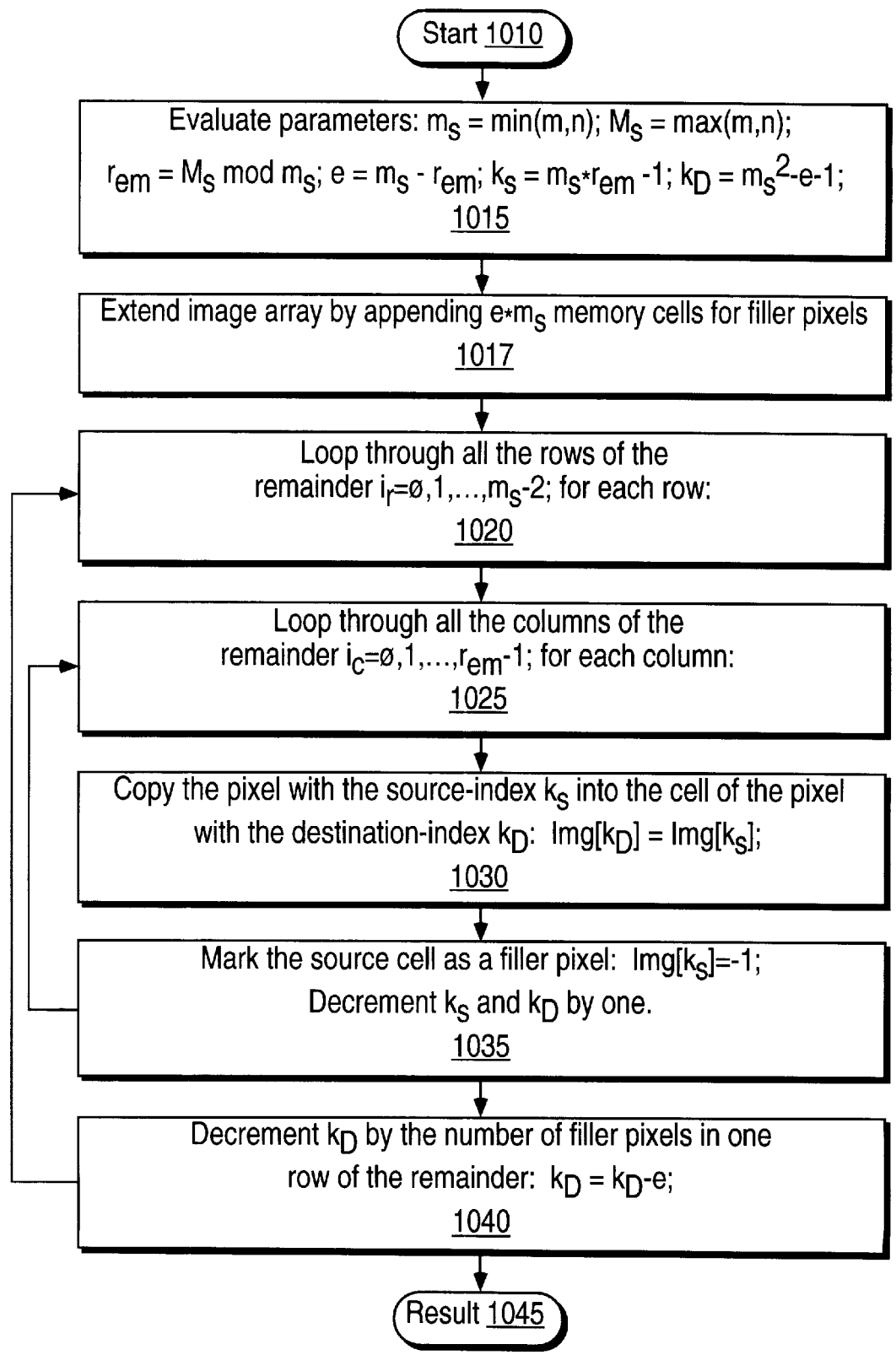

FIGS. 9a and 9b are examples illustrating one embodiment of completing a square after cutting an image in accordance with the present invention. FIG. 9a illustrates completing a square out of a rectangular remainder portion 915a, e.g., similar to the last sub-image 315d shown in the two-dimensional representation of the original image when m is greater than n. In this example, a remainder portion 915a is represented three pixel rows (m=3) by two pixel columns (n=2) in size. Further, the rectangular remainder portion 915a is represented in the memory 115 as a linear memory array portion 915b (generally, remainder portion 915). The linear memory array portion 915b includes memory cell locations 920 that, in this example, are illustrated as memory cell locations 0 through 5.

To complete a square from the rectangular remainder portion 915a, three filler pixels, e.g., empty memory cell locations 925a, 925b, 925c (generally, empty memory cell locations 925), must be added to the remainder portion 915. Specifically, in this example, the square completion module 230 appends to the linear memory array, representing the remainder 915b, the memory cells 6, 7, and 8 necessary to complete the rectangular remainder 915a into a square. To indicate that the appended cells contain filler pixels, these cells are assigned the value (−1). The square completion module 230 then reorders the pixels of the remainder sub-image and the filler pixels, so that the lexicographical order of all the pixels corresponds to a maximal inscribed square. Hence, the filler pixels in cells 925a, 925b, and 925c are inserted, respectively, after memory cell locations 1, 4 and 7, containing pixels 1, 3, and 5. Thus, the portion of the linear memory array representing the remainder sub-image is expanded to encompass the total of nine memory cell locations, specifically, 0 through 8.

FIG. 9b illustrates completing a square out of a rectangular remainder portion 935a. In this example, a remainder portion 935a is five pixel rows (m=5) by two pixel columns (n=2) in size. Further, the rectangular remainder portion 935a is represented in the memory 115 as a linear memory array portion 935b (generally, remainder portion 935). The linear memory array portion 935b includes memory cell locations 920 that, in this example, are illustrated as memory cell locations 0 through 9.

To complete a square from the rectangular remainder portion 935a, fifteen empty memory cell locations 925a, 925b, 925c ... 925o (generally, empty memory cell locations 925) must be added to the remainder portion 935. Specifically, in this example, three empty memory cell locations 925 are added respectively after memory cell locations 1, 3, 5, 7, and 9 so that the remainder rectangle sub-image 935a expands to encompass the total of twenty-five memory cell locations, specifically, 0 through 24 as shown in FIG. 9b.

First, the square completion module 230 appends to the linear memory array representing the remainder 935b, the memory cells 10–24 necessary to complete the rectangular remainder into a square. To indicate that the appended cells contain filler pixels, these cells are assigned the value (−1). The square completion module 230, then, reorders the pixels of the remainder sub-image and the filler pixels, so that the lexicographical order of all the pixels corresponds to a maximal inscribed square. Hence, filler pixels in cells 925a–925o are inserted respectively, after memory cell locations 1, 6, 11, 16, and 21, containing pixels 1, 3, 5, 7, and 9. Thus, the portion of the linear memory array representing the remainder sub-image is expanded to encompass a total of 25 memory cell locations, specifically, 0 through 24.

FIG. 10 is a flow diagram of one embodiment of a process for completing a square from a remainder portion, such as those in the examples of FIGS. 9a through 9b, in accordance with the present invention. The square completion module 230 of the image rotation system 210 starts 1010 the process and evaluates 1015 parameters in the remainder portion, e.g., 91 5a, 935a. In particular, the process initially evaluates 1015 the parameters using:

$$m_s = \min(m, n); \; M_s = \max(m, n); \; r_{em} = M_s \bmod m_s;$$
$$e = m_s - r_{em}; \; \kappa_S = m_s * r_{em} - 1; \text{ and } \kappa_D = m_s^2 - e - 1$$

where $m_s$ is the minimum of m and n, $M_s$ is the maximum of m and n, e is the number of empty cells in a sub-image row, $\kappa_S$ is an index of a source pixel in a linear array, $\kappa_D$ is an index of a destination pixel in a linear array, $r_{em}$ is a remainder of the image partition, that is, the number of pixel cells in a square row that are not empty (it is noted that s represents a source and $_D$ represents a destination).

Once the parameters are evaluated, the process extends 1017 image array by appending (e*$m_s$) memory cells for filler pixels. Then, the process loops 1020 through each pixel row of the remainder portion (except the first row). For example, the process uses an iteration loop for the row, $i_r$ where $\{i_r=0, 1, \ldots m_s-2\}$. For each row in the loop, the process loops 1025 through each pixel column of the remainder portion. For example, the process uses an iteration loop for the column, $i_c$ where $\{i_c=0, 1, \ldots r_{em}-1\}$. For each column, the process copies 1030 a pixel, e.g., pixel 920, with the source index, $\kappa_S$, (e.g. $\kappa_S=2, 3, 4$ for pixels 920) into the memory cell location, e.g., 920, of the pixel with the destination index, $\kappa_D$, (e.g. $\kappa_D=5, 6, 10$, corresponding respectively to pixels with source index $\kappa_S=2, 3, 4$) so that Img[$\kappa_D$]=Img[$\kappa_S$].

The process then marks 1035 a source memory cell location as empty, so that Img[$\kappa_S$]=−1 and the process decrements $\kappa_S$ and $\kappa_D$ by one. After the process loops through each column, the process decrements 1040 $\kappa_D$ by a number of empty memory cell locations in a row of the remainder so that $\kappa_D=\{\kappa_D-e\}$. Once all the process loops through each row in the loop, the result 1045 is that the empty memory cell locations are incorporated into the linear memory array to complete the remainder portion of the image into a square.

Figure 11A:
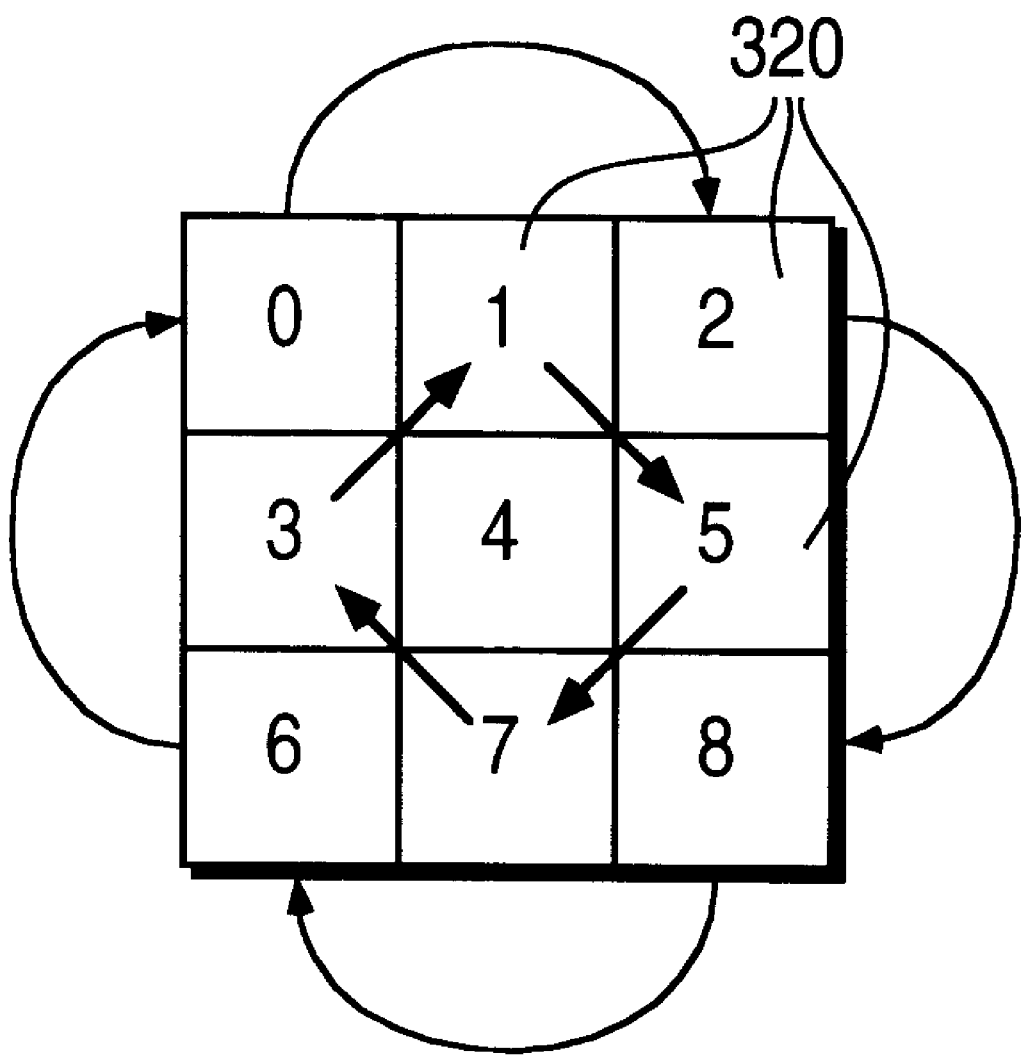
Figure 12:
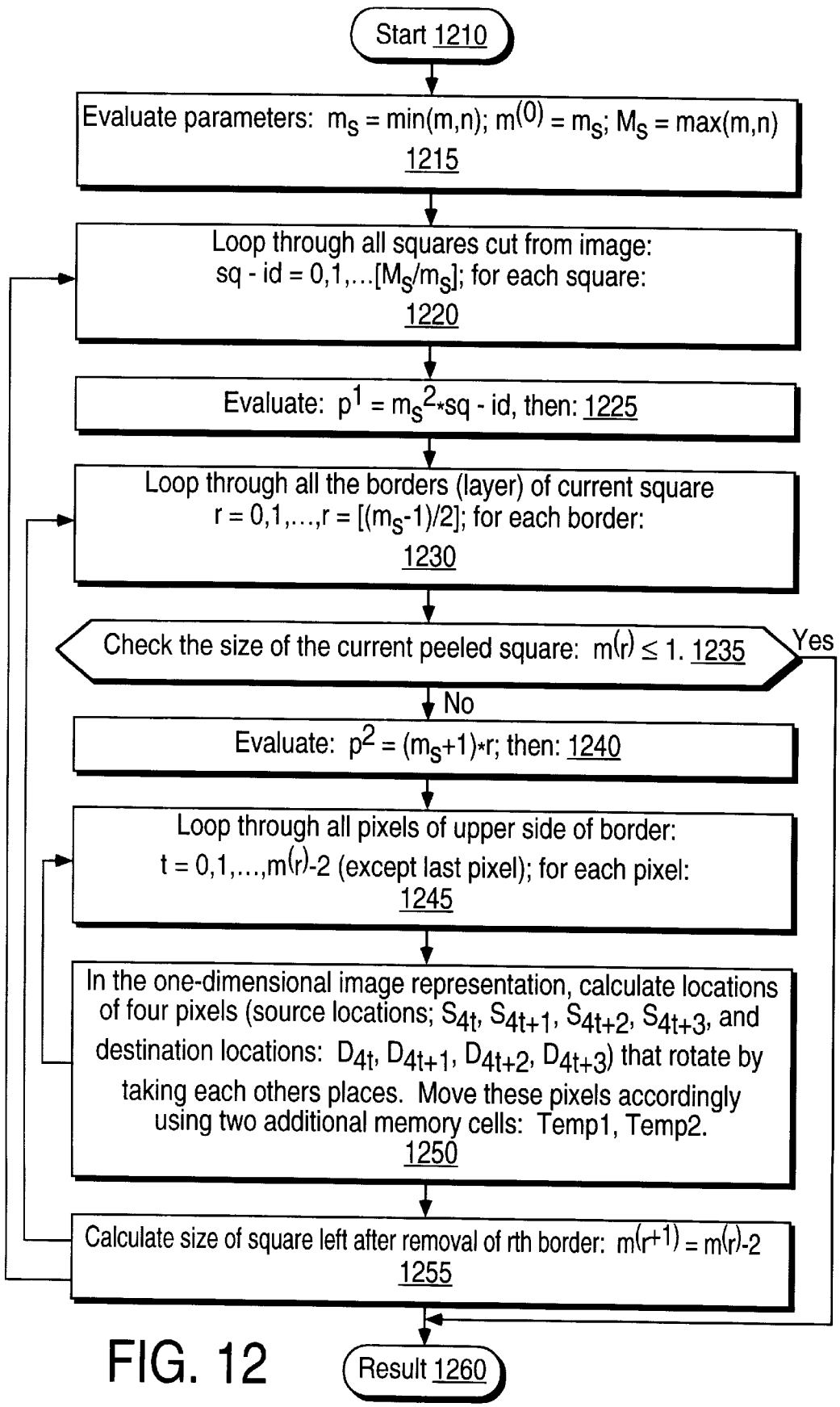

FIGS. 11a and 11b are examples illustrating one embodiment for rotating pixels 320 within a sub-image 315, or square, in accordance with the present invention. FIG. 11a is a first example of rotating pixels by, for example, the rotation module 235 in a sub-image, e.g., 315, of a size of three pixels 320 by three pixels 320. It is noted that, for simplicity and example purposes only, the pixels 320 are numbered from 0 through 8.

To rotate the sub-image, the pixels 320 are rotated so that pixel 0 is moved to the location of pixel 2, pixel 2 is moved to the location of pixel 8, pixel 8 is moved to the location of pixel 6, and pixel 6 is rotated to the location of pixel 0. Then pixel 1 is moved to the location of pixel 5, pixel 5 is moved to the location of pixel 7, pixel 7 is moved to the location of pixel 3, and pixel 3 is rotated to the location of pixel 1. Pixel 4 remains in its original position.

FIGS. 11b-1 through 11b-4 illustrate a second example of rotating pixels in a sub-image, e.g., 315. It is noted that for simplicity and example purposes only, the pixels are numbered from 0 through 35. To rotate the sub-image in FIG. 11b-1, a one-pixel-deep border is "peeled" off one-by-one, and each peeled border is rotated clockwise by an orthogonal or some ninety degree angle.

The system denotes r the ordinal number of the "peeling" (that is, the border being "peeled"), where r takes values from the set $\{0, 1, \ldots r_{max}\}$ and r=0 denotes the border of the original maximal inscribed square, while $r_{max}=[(\min(m, n)-1)/2]=[(m_s-1)/2]$. Also, we denote by $m^{(r)}$ the size of the square obtained from the maximal inscribed square by "peeling off" (removing) $\{r-1\}$ of its borders; by convention, $m^{(0)}=\min(m, n)=m_s$. In the second example, illustrated in FIG. 11b-1, there are three borders, r, 1110, 1115, 1120. Within each border 1110, 1115, 1120, the pixels are rotated in a way similar to the process illustrated in the first example above.

For example, in the first border 1110, r=0, pixel 0 is moved to the location of pixel 5, pixel 5 is moved to the location of pixel 35, pixel 35 is moved to the location of pixel 30, and pixel 30 is moved to the location of pixel 0. Similarly, pixel 1 is moved to the location of pixel 11, pixel 11 is moved to the location of pixel 34, pixel 34 is moved to the location of pixel 24, and pixel 24 is moved to the location of pixel 1. Next, pixel 2 is moved to the location of pixel 17, pixel 17 is moved to the location of pixel 33, pixel 33 is moved to the location of pixel 18, and pixel 18 is moved to the location of pixel 2. The process continues until the pixels of the first border 1110 are rotated to the position as illustrated in FIG. 11b-2.

The second border 1115, r=1, is rotated in a manner similar to the first border 1110. The sub-image is as illustrated in FIG. 11b-3 after the second border 1115 is rotated. In addition, the third boarder 1120, r=2, is also rotated in a manner similar to both the first border 1110 and the second border 1115. The sub-image is as illustrated in FIG. 11b-4 after all three borders 1110, 1115, 1120 have been rotated.

FIG. 12 is a flow diagram illustrating one embodiment of a process for rotating pixels 320 within a square in accordance with the present invention. The rotation module 235 of the image rotation system 210 starts 1210 the process and evaluates 1215 parameters in the sub-image e.g., 310. In particular, the process initially evaluates 1215 the parameters using:

$$m_s=\min(m, n); M_s=\max(m, n); m^{(0)}=m_s$$

where $m_s$ is the minimum of m and n, $M_s$ is the maximum of m and n, and $m^{(0)}$ is the size of the square or sub-image area before "peeling."

After evaluating 1215 the parameters, the process loops 1220 through all the sub-images, or squares, cut from the image. For example, the process uses a loop with an iteration index for each square, sq_id, where $\{sq\_id=0, 1, \ldots, [M_s/m_s]\}$. For each square, the process evaluates 1225 the number p1 of pixels in all the maximal inscribed squares that have already been rotated, where $\{p1=m^2*sq\_id\}$. Then, the process loops 1230 through all the borders of the current square. For example, the process uses a loop with an iteration index for each boundary, r, e.g., 1110, 1115, 1120, where $\{r=0, 1, \ldots [(m_s-1)/2]\}$. For each layer, the process determines 1235 the size of the current pealed square $m^{(r)}$.

If the process determines 1235 that $m^{(r)}$ is less than or equal to one, the result 1260 is that the process ends. If the process determines 1235 that $m^{(r)}$ is greater than 1, the process evaluates 1240 the number p2 of pixels in the linear array representation of the current square that precede the first pixel of its rth border, where $\{p2=(m_s+1)*r\}$. The process then loops 1245 through each pixel 320 of the upper edge of the border, except for the last pixel, the iteration index being t $\{t=0, 1, \ldots, m^{(r)}-2)\}$. For each pixel 320, the process calculates 1250 the locations of the four pixels that rotate by taking each others' places. Specifically, the process calculates the source locations, $S_{4t}, S_{4t+1}, S_{4t+2}$, and $S_{4t+3}$, and the destination locations, $D_{4t}, D_{4t+1}, D_{4t+2}$, and $D_{4t+3}$ for the rotating pixels 320.

It is noted that for this rotation, two additional temporary memory cells, temp1 and temp2, e.g., similar to temporary memory cell 725, are used. The temporary memory cells are used to write out pixels 320 from destination memory cell locations so that they are open to receive pixels 320 from source memory cell locations. After each pixel 320 is rotated as described above, the process calculates 1255 the portion of the square ("peeled square") remaining after removal of the rth boundary layer. Specifically, the process calculates the size of the peeled square $m^{(r+1)}$, where $\{m^{(r+1)}=m^{(r)}-2\}$.

Once all the squares have been looped 1220 through, the result 1260 is that all of the sub-images of the (initial or intermediate) portrait image are rotated, but the portrait orientation of the image is not changed.

As mentioned previously, calculation of the square boundaries in the case of portrait-to-landscape rotation, that is where m is greater than or equal to n, is as follows: each square contains $n^2$ contiguous pixels in the linear array representation, so that squares are delimited by simple pixel counting. Next, the square completion includes appending n*(n−mmodn) empty memory cells to the end of the linear array representing the image in the portrait position (after the inversion of pixel order, if necessary). Thus, the rotation of the individual maximal inscribed squares is performed in the same way as in the case of landscape-to-portrait rotation. Moreover, the direction of the individual square rotations remains clockwise, without regard on the direction of the actual image rotation. It is noted, however, that the squares of the resulting image should be collated to produce the proper landscape orientation of the rotated image.

Figure 13A:
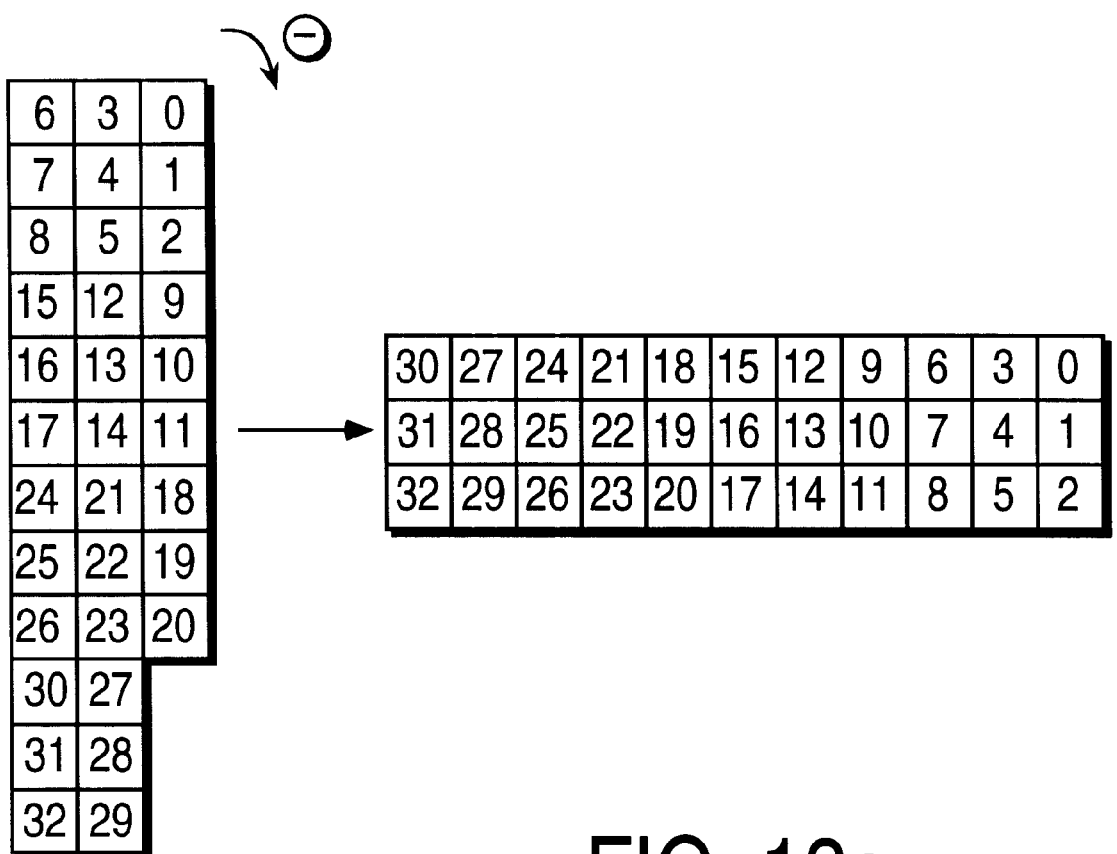
FIG. 13a illustrates in two dimensions one embodiment of a transformation performed by the collation module on a portrait image that is a superimposition of clockwise rotated sub-images in accordance with the present invention.

The original portrait image, after rotation of its sub-images and subsequent compression to eliminate the filler pixels or empty memory cells, is represented as a two-dimensional array 510c. The result of the process of collation of the sub-images 515a, 515b, 515c, 515d is also represented as a two-dimensional array 510d. For convenience, the two-dimensional representations 510c and 510d illustrated in FIG. 5a are also shown in FIG. 13a to illustrate collation.

Figures 1, 13B:
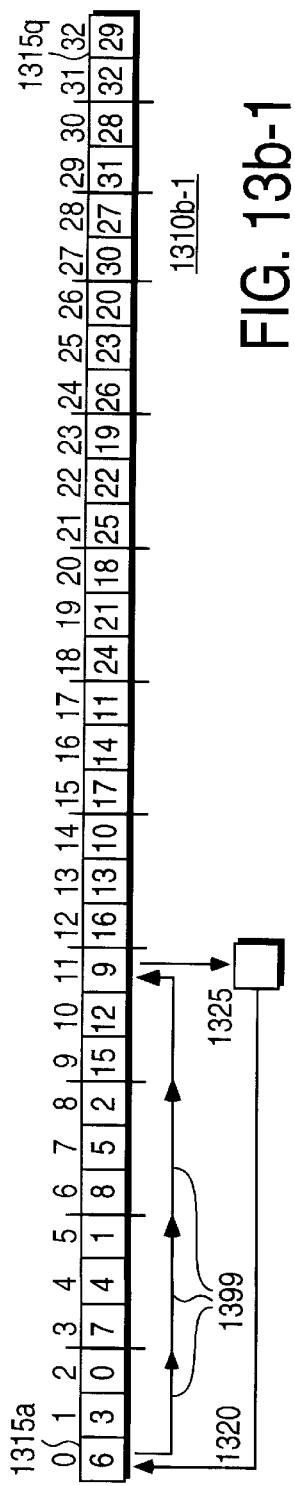
Figures 2, 13B:
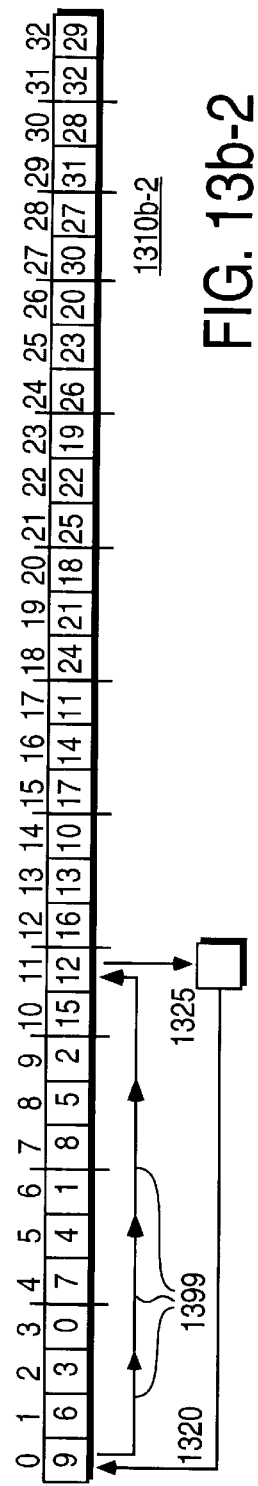
Figures 3, 13B:
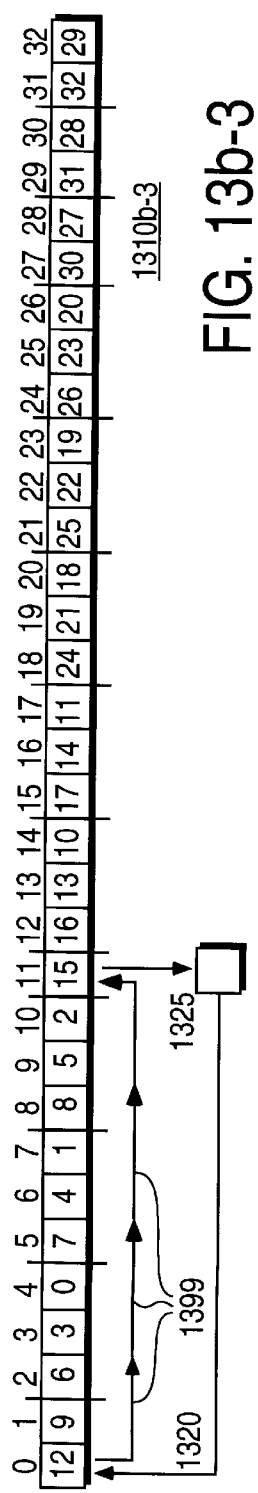
Figures 7, 13B:
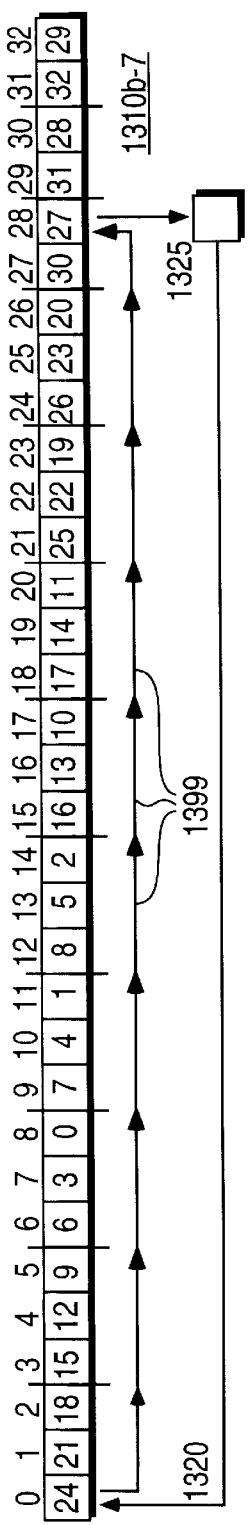
Figures 8, 13B:
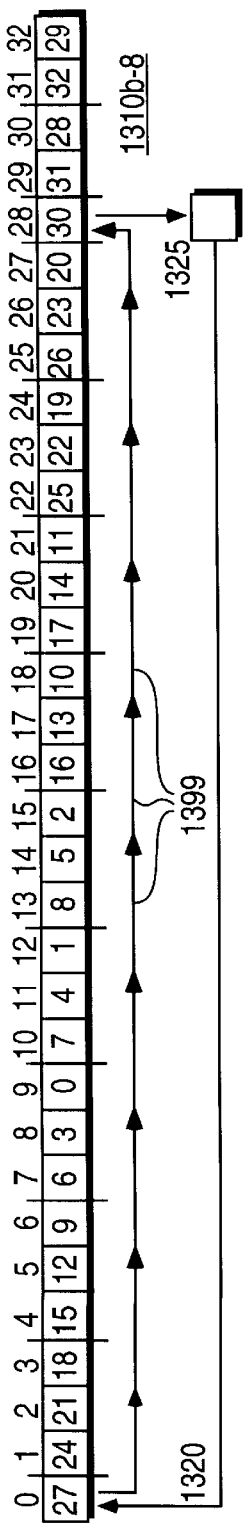
Figures 9, 13B:
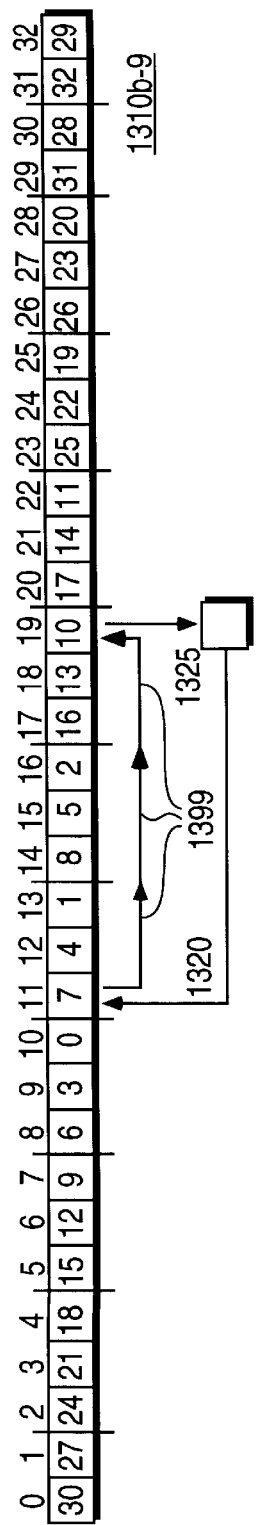
Figures 10, 13B:
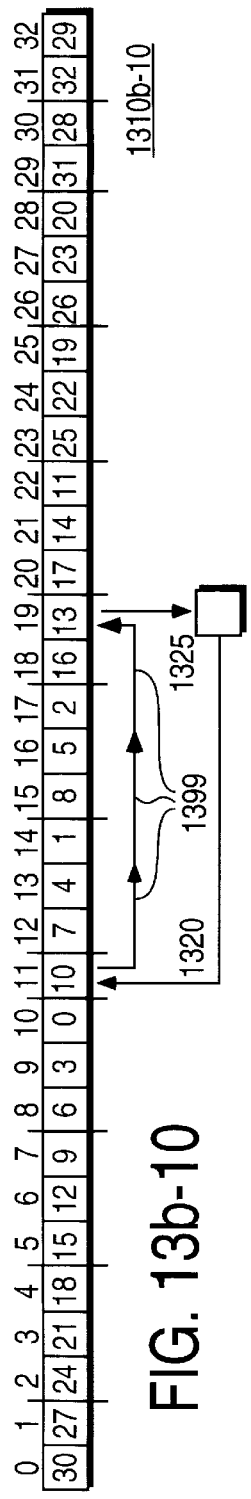
Figures 11, 13B:
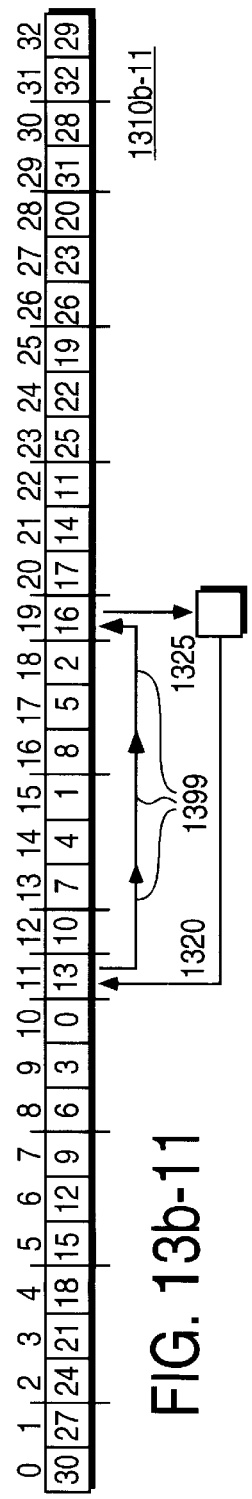
Figures 12, 13B:
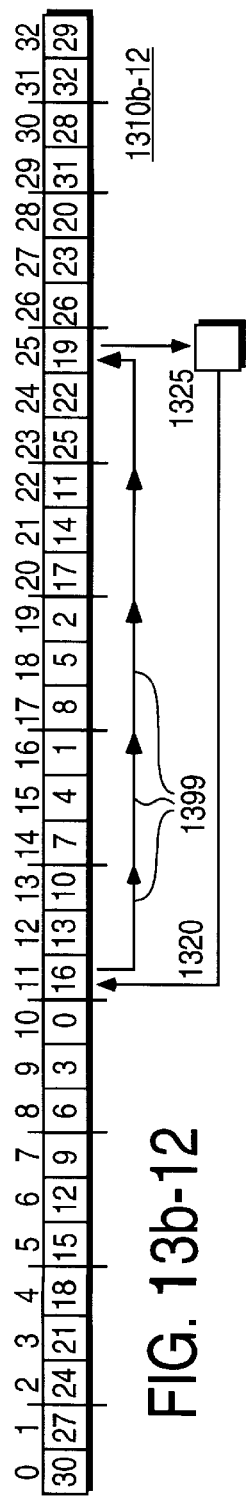
Figures 13, 13B:
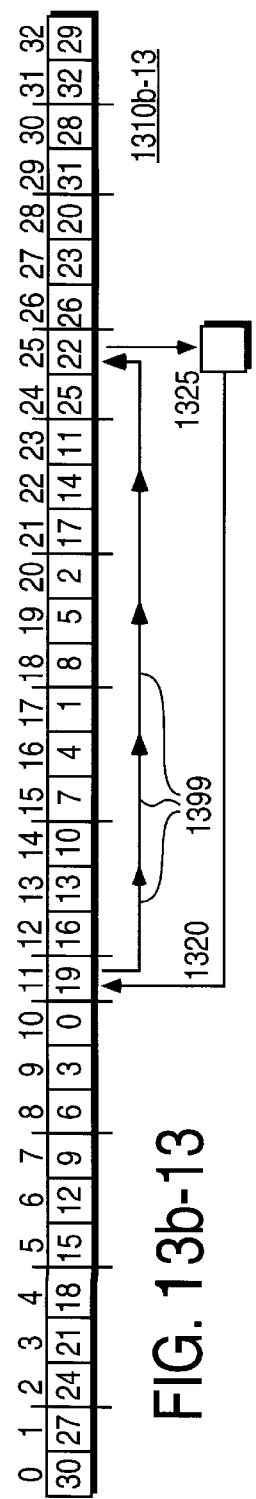
Figures 13, 13B, 14:
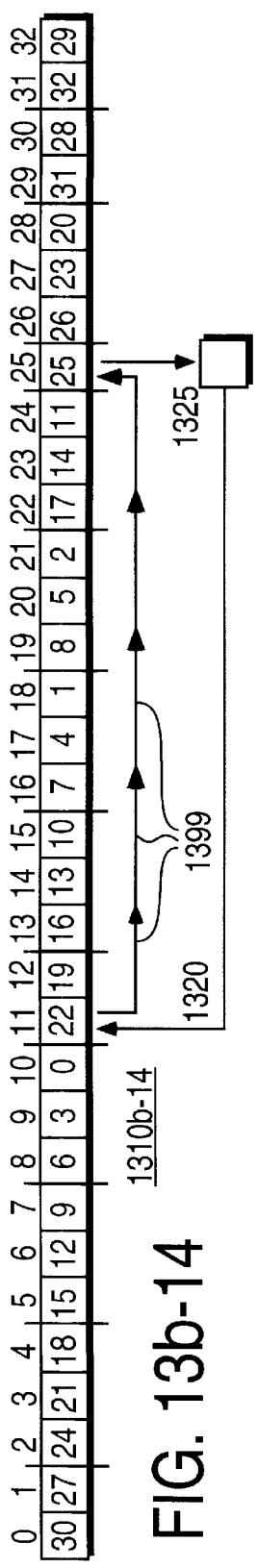
Figures 13, 13B, 14, 15:
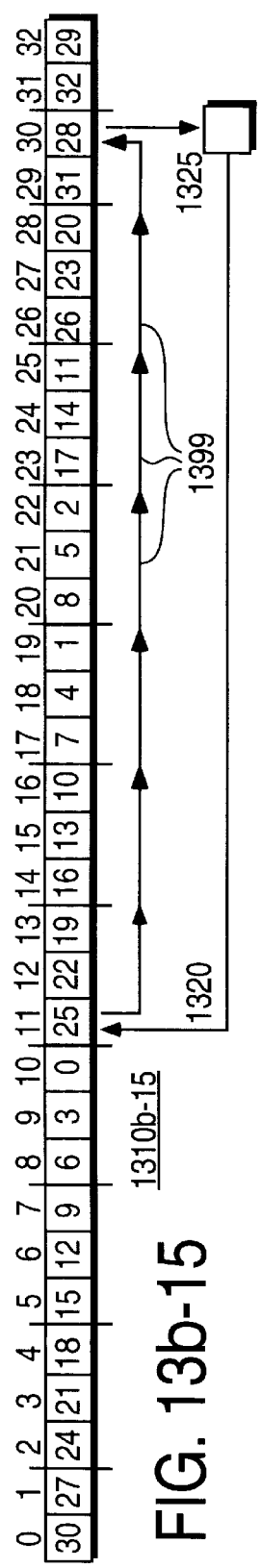
Figures 13, 13B, 14, 15, 16:
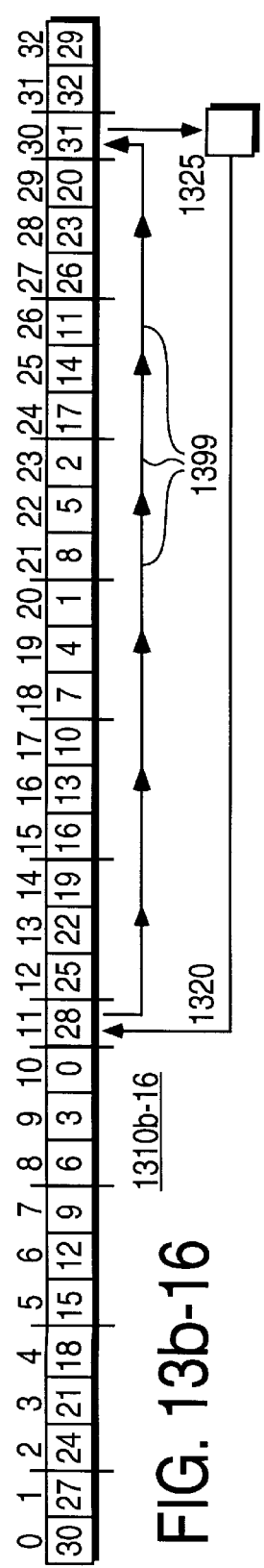
Figures 13, 13B, 14, 15, 16, 17:
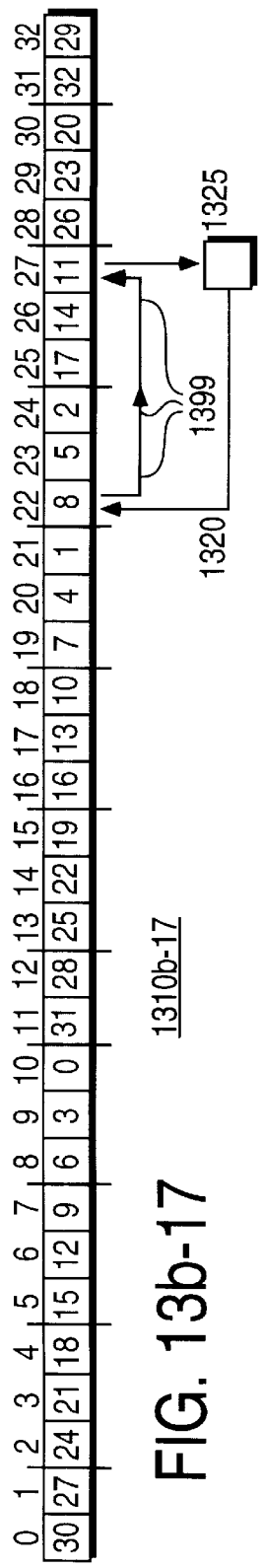
Figures 13, 13B, 14, 15, 16, 17, 18:
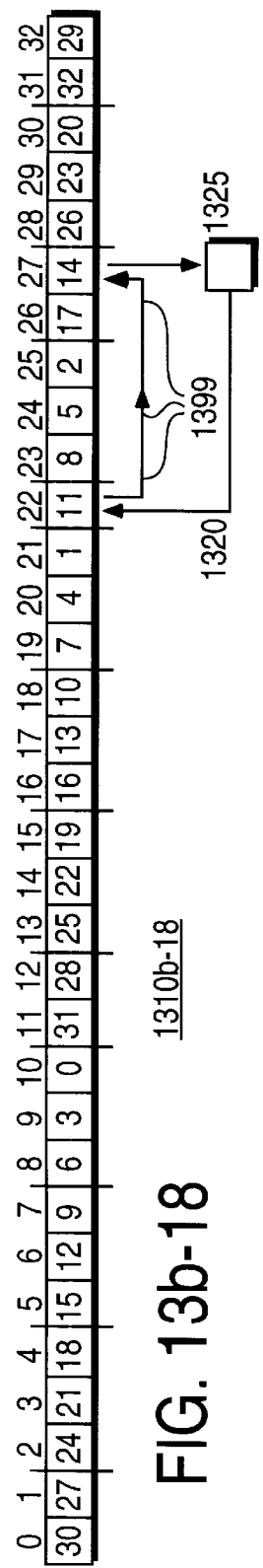
Figures 13, 13B, 14, 15, 16, 17, 18, 19:
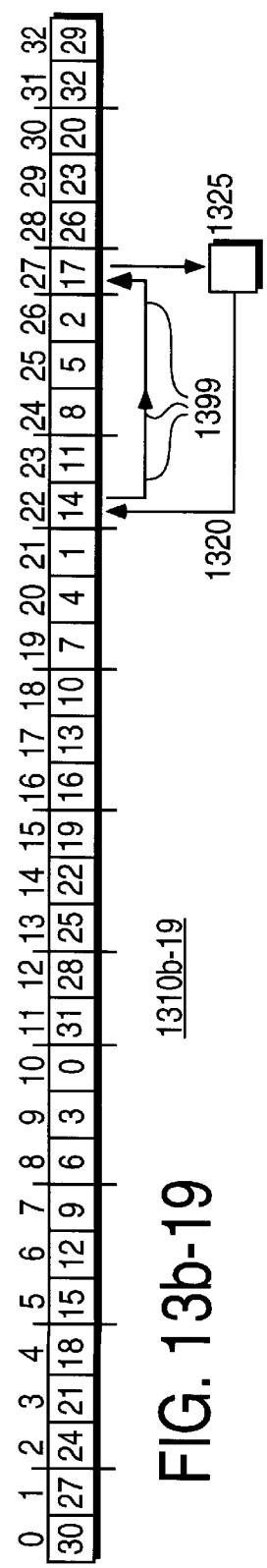
Figures 13, 13B, 14, 15, 16, 17, 18, 19, 20:
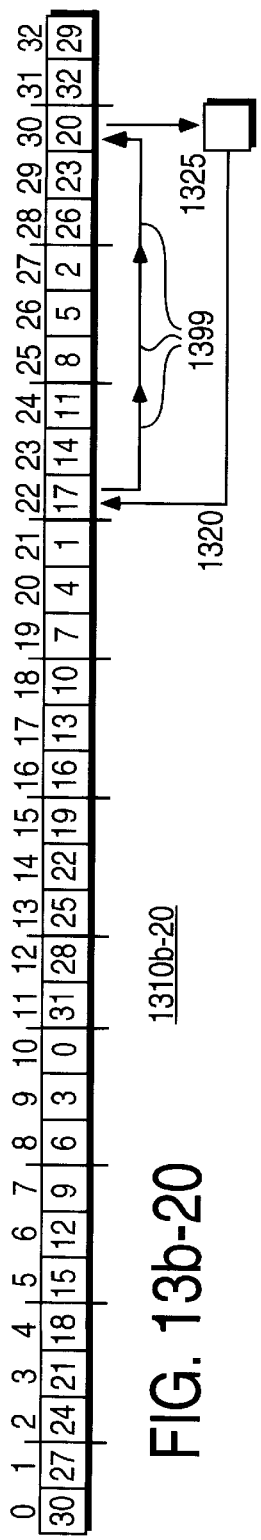
Figures 13, 13B, 14, 15, 16, 17, 18, 19, 20, 21:
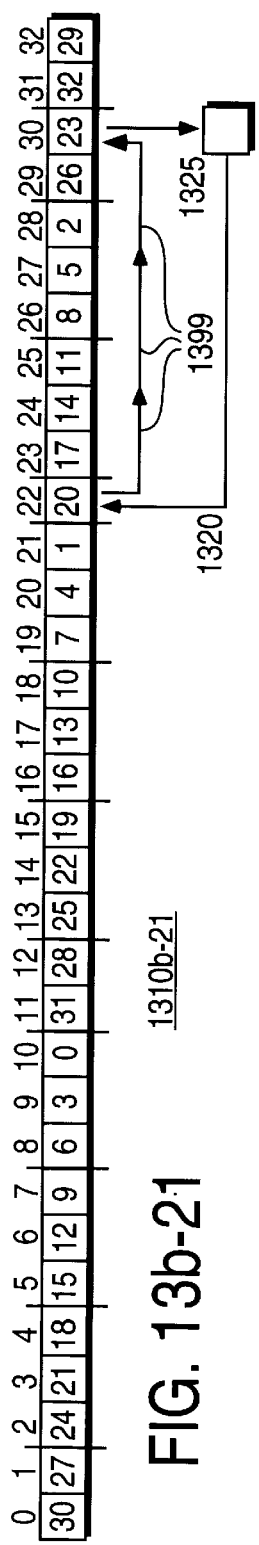
Figures 13, 13B, 14, 15, 16, 17, 18, 19, 20, 21, 22:
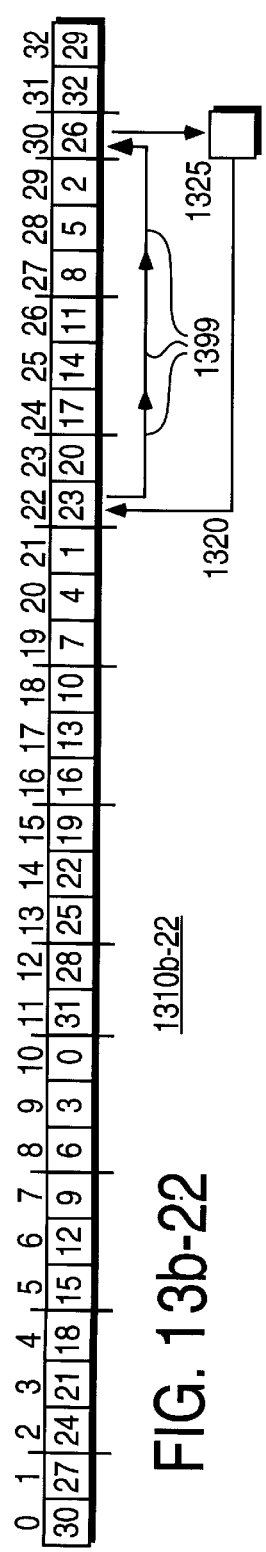
Figures 13, 13B, 14, 15, 16, 17, 18, 19, 20, 21, 22, 23:
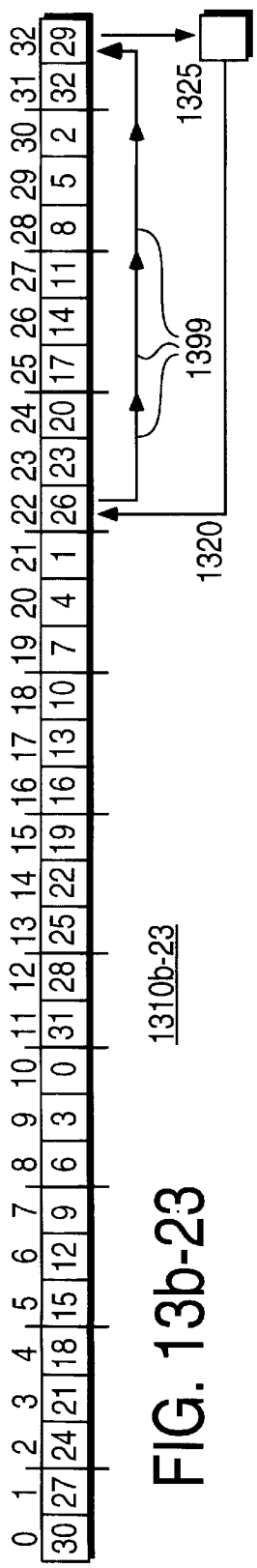
Figures 13, 13B, 14, 15, 16, 17, 18, 19, 20, 21, 22, 23, 24:
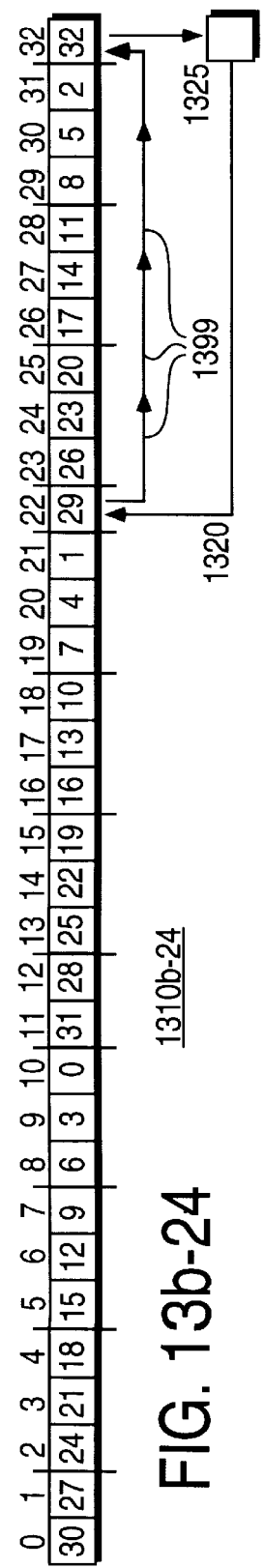

FIGS. 13b-1 to 13b-24 and 13c illustrate one embodiment of a linear memory array pixel processing diagram for collating the sub-images 515a, 515b, 515c, 515d of the image 510c into a landscape image 510d. It is noted that for example and illustration purposes only, FIG. 13b-1 illustrates the linear memory array 1310 representation of the portrait image 510c illustrated in FIG. 13a.

The linear memory array 1310 is located in the memory 115. The linear memory array 1310 includes one or more fixed memory cell location 1315a–1315q (generally 1315), where a is a location for the first pixel and q is a location for the last pixel. Each memory cell location 1315 in this example is identified by a memory cell location number 0 through 32. Each memory cell location 1315 includes a pixel 520 from its image 510c shown in FIG. 5a, where the pixels 520 correspond to their location in the actual, two-dimensional visualized image 510c.

Generally, as discussed above, once the orientation unit 220 determines that the orientation of the original image 510a is portrait in this example, the cutting process is skipped. Specifically, as described above, it is possible to skip the cutting process because the maximal inscribed squares are defined by compact sequences of adjacent pixels in the linear array representation of a portrait image so that the image is already partitioned or "cut" into a plurality of superimposed maximal inscribed squares.

After the direction of rotation is determined (clockwise in this example), the square completion module 230 provides for a full square for the part of the image that remains after extraction of all maximal inscribed squares, as described above. The rotation module 235 then rotates all the sub-images 515a, 515b, 515c, 515d which, after compression, results in the portrait image 510c as described above. To produce the landscape image 510d from the portrait image 510c, the squares 515a, 515b, 515c, 515d are collated by the collation module 240.

To further describe collation, it is again noted that lexicographical ordering is used to maintain the one-to-one correspondence between a two-dimensional array and the one-dimensional array representations of an image, as described above. The process for arranging the pixels 520 of the linear array representation of the original image 1310b-1 into the linear array representation of the final image 1310c is described through FIGS. 13b-1 to 13b-24.

Briefly, as generally described above, the collation module 240 begins by concatenating all the first sub-image rows (e.g., the first rows of the sub-images 515a, 515b, 515c, and 515d) to produce the first row of the landscape image 510d. The concatenation itself begins by appending the first row of the second sub-image 515b to the first row of the first sub-image 515a. Then, the first row of the third sub-image 515c is appended to the previous concatenation. Finally, the first row of the last (remainder) sub-image 515d is appended to the concatenation of the first three rows to produce the first row of the landscape image.

Once each first row of the landscape image is concatenated, the collation module 240 concatenates in a similar way second rows of the first, the second, the third and the last sub-images 515a, 515b, 515c, 515d to produce a second row of the landscape image 510d. The collation module 240 continues to process in a similar way each remaining row of each of the sub-images 515a, 515b, 515c, 515d, until the landscape image 510d is complete.

The locations of the pixels 520 in the first sub-image 515a are adjusted through subsequent shifts 1399 performed by the collation module 240. It is noted that in one embodiment the shifts 1399 may be implemented as a shift register function. Initially, the collation module 240 determines what pixels 520 are in the first row of the second sub-image 515b and these pixels 520 are suppressed and moved toward the front of the linear array 1310b. In this example, the first row of the second sub-image 515b includes pixel numbers 15, 12, and 9.

To suppress the pixels 520 in the first row of the second sub-image 515b, the collation module 240 marks an insertion point 1320 for the suppressed pixels 520 at the first memory cell location 0 of the first sub-image 515a. This corresponds to the first memory cell location of the linear array 1310b. The insertion point 1320 is considered an entry point because pixel numbers 6, 3, and 0 should follow pixel numbers 15, 12, and 9 in the first row of the resulting landscape image 510d.

The collation module 240 then marks the memory cell location 11, from which all the pixels belonging to the first row of the second sub-image 515b can be pushed through to the insertion point 1320 (memory cell location 0). The collation module 240 provides an empty temporary memory cell 1325 from the memory 115 to which the collation module 240 writes out pixel number 9 from cell location 11. After writing out pixel number 9 to the empty temporary memory cell 1325, the collation module 240 performs a shift function where pixel number 12 is shifted to the memory location 11 (the shift function in FIGS. 13b-1 to 13b-24 are illustrated through the repeated arrows 1399).

With memory cell location 10 open, pixel number 15 is shifted 1399 into memory cell location 10. Each subsequent pixel up to, and including, the pixel in the entry point (memory cell location 0 having pixel number 6) is similarly shifted 1399. By shifting pixel number 6 to memory cell location 1, there is now an empty space at memory cell location 0. The pixel number 9, which is in the temporary memory cell 1325, is now inserted by the collation module 240 into the memory cell location 0 and the linear memory array 1310 is as illustrated in FIG. 13b-2.

To complete processing of the first row of the second sub-image, pixels 12 and 15 must also be moved in front of the already inserted pixel 9. As with pixel 9, the collation module 240 uses the empty temporary memory cell 1325 from the memory 115 to write out pixel number 12 from memory cell location 11. It is noted that the memory cell location 11, from which the pixel number 12 was taken, is not changed. Once pixel 12 is written to the temporary memory cell 1325, the pixels that are in memory cell locations 10 through 0 are shifted 1399 down one memory cell location. Specifically, the pixels at these locations are shifted to the subsequent memory cell location, similarly to the way described above with respect to the shift after writing out pixel 9.

With memory cell location 0 now open, collation module 240 writes pixel 12 from the temporary memory cell 1325 to the memory cell location 0. Pixels 12 and 9 are now in memory cell locations 0 and 1, respectively, and the linear memory array 1310 is as shown in FIG. 13b-3.

Next, as with pixel 12, the collation module 240 uses the empty temporary memory cell 1325 from the memory 115 to write out pixel number 15 from memory cell location 11. Note again that the memory cell location 11, from which the pixel number 15 was taken, is not changed. Once pixel 15 is written to the temporary memory cell 1325, the pixels that are in memory cell locations 10 through 0 are shifted 1399 down one memory cell location. Specifically, the pixels at these locations are shifted to the subsequent memory cell location, similarly to the way described above with respect to the shift after writing out pixel 12.

With memory cell location 0 now open, pixel 15 is written from the temporary memory cell 1325 to the memory cell location 0 by the collation module 240. Pixels 15, 12, and 9 are now in memory cell locations 0, 1, and 2, respectively, and the linear memory array 1310 is as shown in FIG. 13b-4.

Once pixels 15, 12, and 9 are pushed to the front of the linear memory array, pixels 24, 21, 18 are also pushed to the front of the linear memory array in a similar manner. That is, the collation module 240 marks the memory cell location 20, which contains the last pixel 18 of the first row of the third sub-image 515c. Then, the collation module 240 places pixel 18 from the marked memory cell location 20 into the empty temporary memory cell 1325.

It is noted that the memory cell location of the pixel to be moved to the temporary memory cell 1325 changes with the sub-image to which this pixel belongs. The location of the insertion point 1320 remains the same; it changes only with the change of the row of the landscape image, i.e., when collation of a new row of the landscape image is initiated).

With memory cell location 20 open, pixels 21 through 15 that are in subsequent memory cell locations 19 through 0 respectively, are shifted 1399 down by one memory cell location to the subsequent memory cell locations as described above. These repeated shifts 1399 result in the memory cell location 0 being open. The collation module 240 places pixel 18 into the open memory cell location 0, so that the linear memory array 1310 is now as illustrated in FIG. 13b-5.

Similarly, the collation module 240 writes out pixel 21 from memory cell location 20 to the now empty temporary memory cell 1325. The pixels in memory cell locations 19 through 0 are shifted 1399 down one memory cell location to the subsequent memory cell location so that memory cell location 0 is open. The collation module 240 writes out pixel 21 from the temporary memory cell 1325 to the open memory cell location 0. The linear memory array is now as illustrated in FIG. 13b-6.

Similarly, the collation module 240 writes out pixel 24 from memory cell location 20 to the now empty temporary memory cell 1325. Again, the pixels in memory cell locations 19 through 0 are shifted 1399 down one memory cell location to the subsequent memory cell location so that memory cell location 0 is open. The collation module 240 writes out pixel 24 from the temporary memory cell 1325 to the open memory cell location 0. The linear memory array is now as illustrated in FIG. 13b-7.

Once pixels 24, 21, and 18 are pushed to the front of the linear memory array 1310b-7, pixels 30 and 27 are also pushed to the front of the linear memory array in a similar manner. That is, the collation module 240 marks the memory cell location 28, which contains the last pixel 27 of the first row of the last (remaining) sub-image 515d. The collation module 240 then places pixel 27 from the marked memory cell location 28 into the empty temporary memory cell 1325.

It is noted that the memory cell location of the pixel to be moved to the temporary memory cell 1325 changes with the sub-image to which this pixel belongs. The location of the insertion point 1320 remains the same; it changes only with the change of the row of the landscape image, i.e., when collation of a new row of the landscape image is initiated.

With memory cell location 28 open, pixels 30 through 24 that are in subsequent memory cell locations 27 through 0 respectively, are shifted 1399 down by one memory cell location to the subsequent memory cell locations as described above. These repeated shifts 1399 result in the memory cell location 0 being open. The collation module 240 places pixel 27 into the open memory cell location 0, so that the linear memory array 1310 is now as illustrated in FIG. 13b-8.

Similarly, the collation module 240 writes out pixel 30 from memory cell location 28 to the now empty temporary memory cell 1325. Again, the pixels in memory cell locations 27 through 0 are shifted 1399 down one memory cell location to the subsequent memory cell location so that memory cell location 0 is open. The collation module 240 writes out pixel 30 from the temporary memory cell 1325 to the open memory cell location 0. The linear memory array is now as illustrated in FIG. 13b-9. The collation of the first row of the landscape image is now complete.

Once the first row of the landscape image is collated, the image rotation system 210 collates the next row of the landscape image. As with the first row of the landscape image, the collation module 240 identifies and marks an insertion point 1320 for the suppressed pixels 520. The insertion point moves from the front 0 of the linear memory array to memory cell location 11.

This insertion point 1320 is considered an entry point because pixel numbers 7, 4, and 1 are at the end of the second row of the landscape image. The locations of these pixels are automatically adjusted through subsequent shifts performed by the collation module 240. The collation module 240 marks the cell 19 from which all the pixels belonging to the second row of the second sub-image 515b can be pushed through to the insertion point 1320 (memory cell location 11).

Once the insertion point 1320 is marked for the second row of the landscape image, the collation module 240 shifts the pixels 520 of the second rows of sub-images 515b, 515c, 515d within the linear memory array 1310. The shifting is similar to that described above for the pixels 520 of the first row (pixel numbers 9, 12, 15, 18, 21, 24, 27, 30) of the landscape image. Specifically, the pixels 520 that must be re-arranged in the linear memory array 1310 for the second row of the landscape image are pixels 16, 13, 10, 25, 22, 19, 31, and 28.

In particular, pixel 10 is written out from memory cell location 19 to the temporary memory cell 1325. The pixels in subsequent memory cell locations 18 through 11 are shifted 1399 down one memory cell location so that memory cell location 11 is open. The collation module 240 then writes out the pixel 10 from the temporary memory cell 1325 to the open memory cell location 11. The linear memory array 1310 is now as illustrated in FIG. 13*b*-10.

Similarly, the content of the memory cell location 19 (which is now pixel number 13) is again saved in the temporary memory cell 1325 by the collation module 240. The pixels in subsequent memory cell locations 18 through 11 are shifted as described above and pixel 13 is written from the temporary memory cell 1325 to the new open memory cell location 11. The linear memory array 1310 is now as illustrated in FIG. 13*b*-11.

The process is functionally the same for pixel 16, which is now in memory cell location 19. That is, the collation module 240 writes out pixel 16 to the temporary memory cell location 1325. The pixels in the subsequent memory cell locations 18 through 11 are shifted 1399 as described above and pixel 16 is written out from the temporary memory cell location 1325 to the new empty memory cell location 11. The result is a linear memory array 1310 as illustrated in FIG. 13*b*-12.

The next set of pixels 19, 22, and 25 are shifted from memory cell location 25 to memory cell location 11 in a way similar to the one for pixels 10, 13, and 16. That is, the collation module 240 marks the memory cell location 25, which contains the last pixel 19 of the second row of the third sub-image 515*c*. The insertion point 1320 remains the same; as described above, the location of the insertion point 1320 changes with the change of the landscape row being processed. Pixels 19, 22, and 25 are then moved from memory cell location 25 to memory cell location 11, and the linear memory array is illustrated in FIGS. 13*b*-13, 13*b*-14, and 13*b*-15, respectively, after the respective pixels have been shifted 1399.

The next set of pixels 28 and 31 are shifted from memory cell location 30 to memory cell location 11 in a way similar to the one for pixels 19, 22, and 25. That is, the collation module 240 marks the memory cell location 30, which contains the last pixel 28 of the second row of the remaining sub-image 515*d*. The insertion point 1320 remains the same.

Pixels 28 and 31 are then moved from memory cell location 30 to memory cell location 11, and the linear memory array is illustrated in FIGS. 13*b*-16 and 13*b*-17, respectively, after the respective pixels have been shifted 1399. Thus, after pixels 28 and 31 have been shifted, the second row of the landscape image is completed with pixels 30, 27, 24, 21, 18, 15, 12, 9, 6, 3, and 0 in the respective memory cell locations 0 through 10 in the linear memory array 1310.

Once the second row of the landscape image is arranged within the linear memory array 1310, the image rotation system 210 collates the third and last row of the landscape image. As with the previous two landscape image rows, the collation module 240 identifies and marks an insertion point 1320 for the suppressed pixels 520.

The insertion point 1320 moves from cell location 11 to memory cell location 22. This insertion point 1320 is considered an entry point because pixel numbers 8, 5, 2 are at the end of the last row of the landscape image. The locations of these pixels are adjusted through subsequent shifts performed by the collation module 240. Then, the collation module 240 marks the cell 27 from which all the pixels belonging to the last row of the second sub-image 515*b* can be pushed through to the insertion point 1320 (memory cell location 22).

A first set of pixels, specifically pixels 11, 14, and 17, are moved from memory cell location 27 to memory cell location 22, similar to how pixels 9, 3 12, 15, 18, 21, 24, 27, 30, 10, 13, 16, 19, 22, 25, 28, and 31 in the previous two landscape image rows were moved. That is, pixels 11, 14, and 17 are moved from memory cell location 27 to memory cell location 22, and the linear memory array 1310 is illustrated in FIGS. 13*b*-18, 13*b*-19, and 13*b*-20 after respective pixels have been shifted 1399.

The processing steps involving pixels 11, 14, and 17 are repeated for pixels 20, 23, and 26 as each of these pixels is moved from memory cell location 30 to memory cell location 22. Note that the collation module 240 has marked a new location 30 of the memory cell, the contents of which are saved in the temporary memory cell 1325. The insertion point 1320 does not change. The linear memory array 1310 is illustrated in FIGS. 13*b*-21, 13*b*-22, and 13*b*-23, respectively, after pixels 20, 23, and 26 have been moved.

Figure 13C:
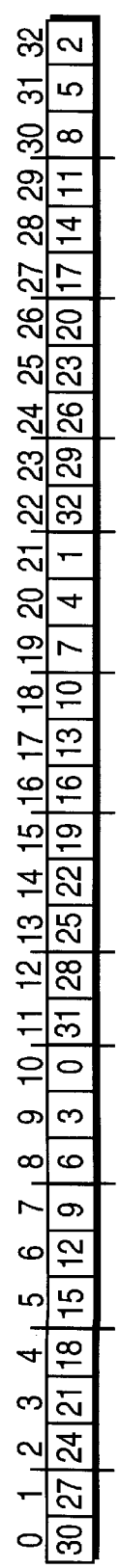

The processing steps involving pixels 23 and 26 are repeated for pixels 29 and 32 as each of these pixels is moved from memory cell location 32 to memory cell location 22. It is noted that the collation module 240 has marked a new location 32 of the memory cell, the contents of which are saved in the temporary memory cell 1325. The insertion point 1320, however, does not change. The linear memory array 1310 is illustrated in FIGS. 13*b*-24 and 13*c* respectively, after pixels 29 and 32, respectively, have been moved. Moreover, FIG. 13*c* illustrates the linear memory array 1310 having the pixels 520 aligned in the lexicographical order that corresponds to the two-dimensional landscape image resulting from the orthogonal or some ninety degrees clockwise rotation of the portrait image 510*a*.

Figure 14A:
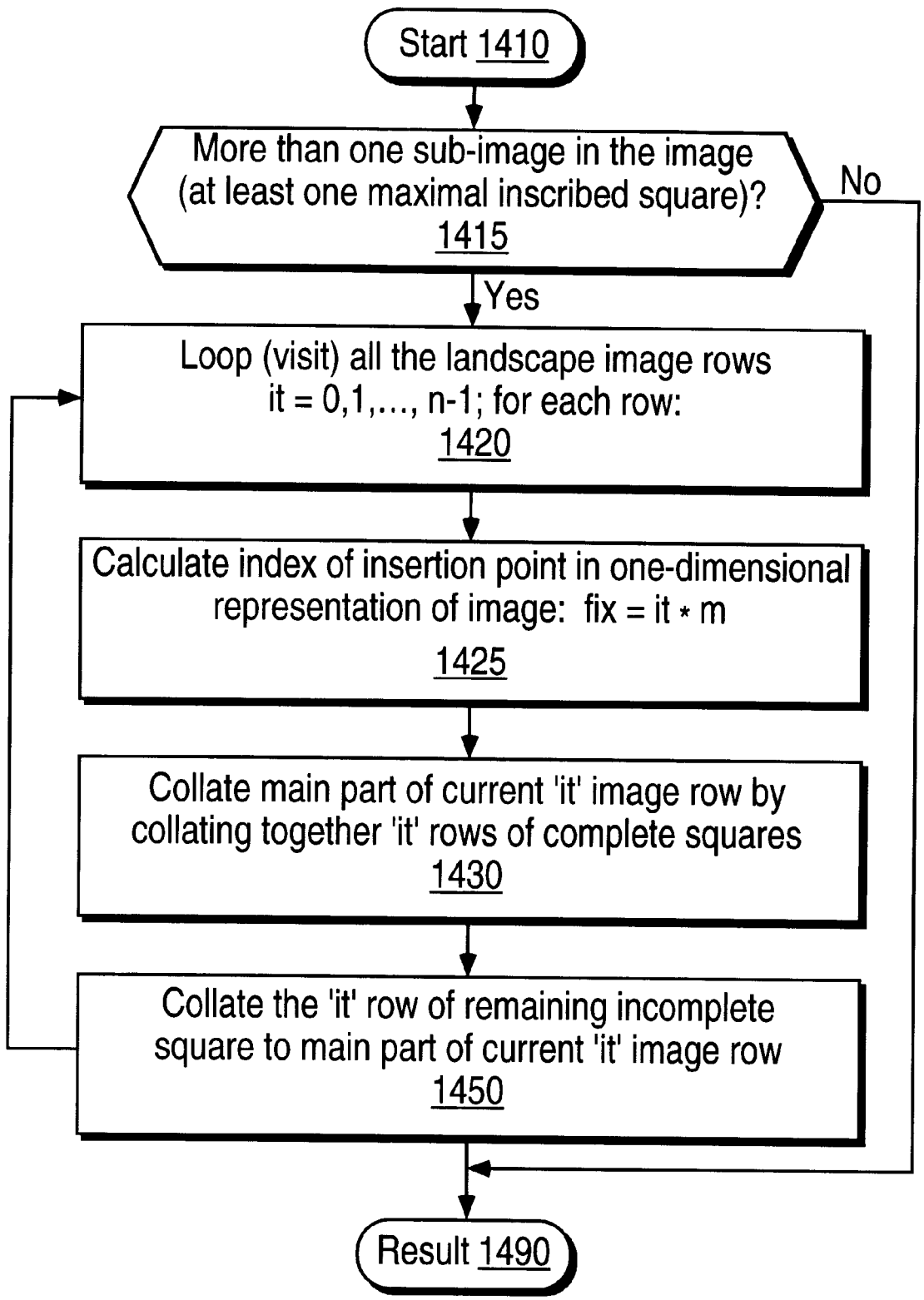
FIGS. 14a, 14b, and 14c are flow diagrams of one embodiment of collating sub-image rows of a portrait image to obtain a landscape image in accordance with the present invention.
Figure 14B:
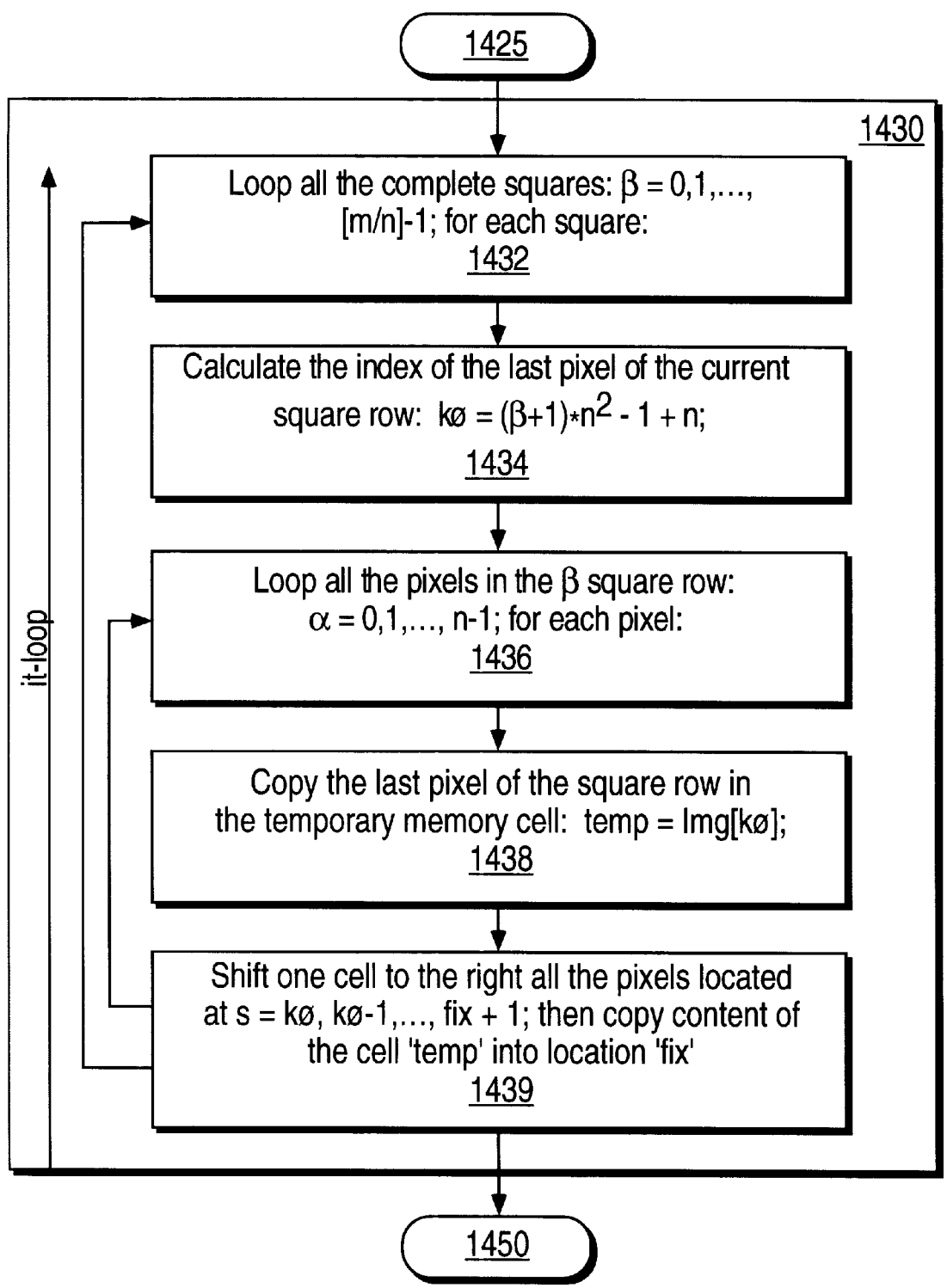
Figure 14C:
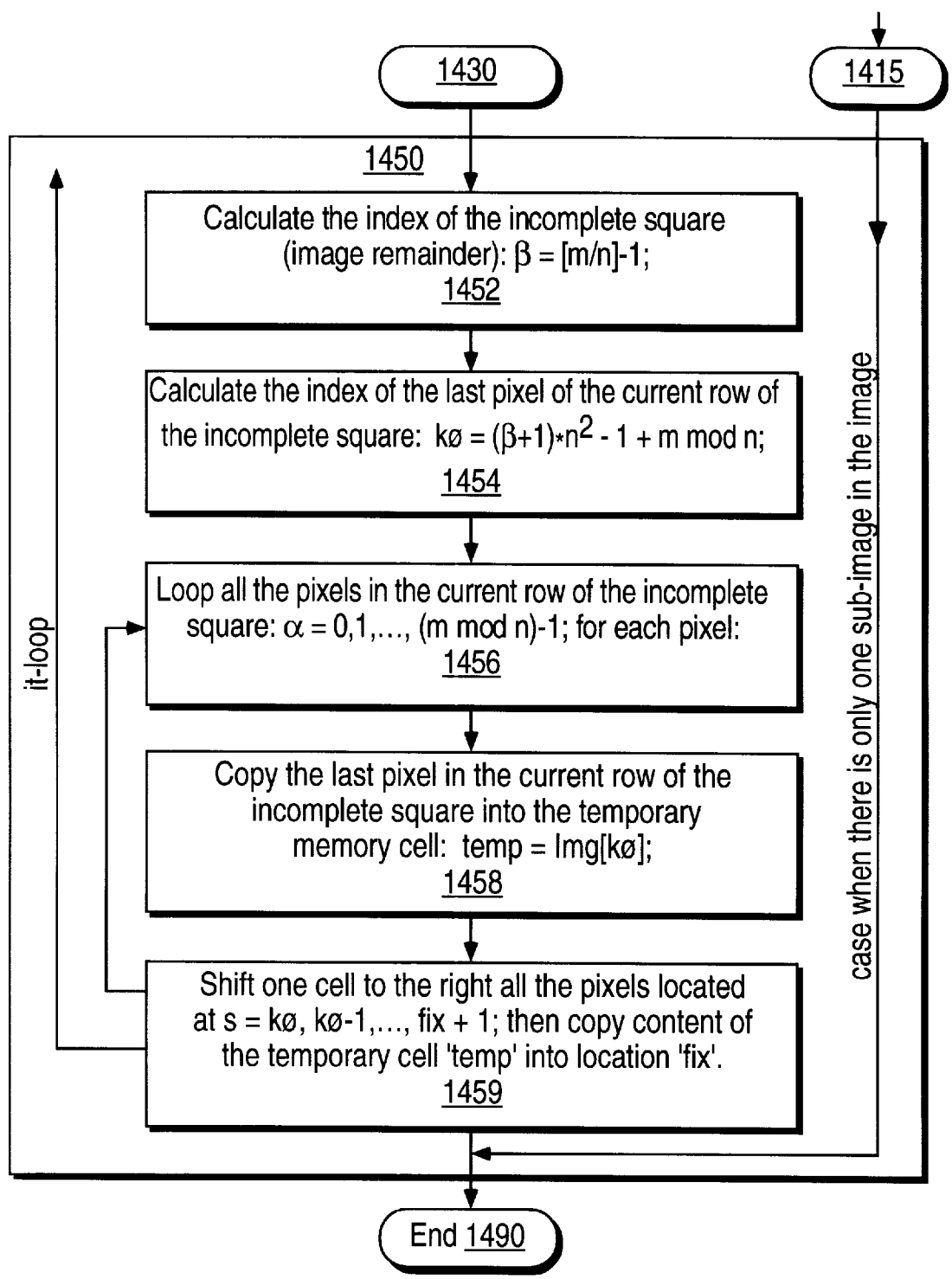

FIGS. 14*a*, 14*b*, and 14*c* are flow diagrams for one embodiment of collating rows of a portrait image, the sub-images of which were previously rotated and compressed, in accordance with the present invention. Turning first to FIG. 14*a*, the collation module 240 of the image rotation system 210 starts 1410 the process by first determining 1415 if there is more than one sub-image in the original portrait image (at least one of them being a maximal inscribed square).

When there is only one sub-image, the result 1490 is that the process ends. There is no need for collation in this case. When there is more than one sub-image, the process loops 1420 through all rows of the landscape image, where the iterations index, it, takes the values it=0 1, . . . , n−1. For each iteration, the process calculates 1425 the index of the insertion point 1320 in the one-dimensional representation of the image, e.g., the linear memory array 1310 of the image 510*c*. The index of the insertion point 1320 is identified by {fix=it*m;}, where fix is the location of the insertion point 1320 for this iteration (collation of the current landscape image row) in the linear memory array 1310.

The process continues by collating 1430 together, all the full-square sub-image rows with row number equal to it, into the it-th row of the landscape image, which may be incomplete. The process completes the it-th row of the landscape image by collating 1450 the it-th row of the remaining sub-image (e.g., 515*d*) to the already collated sub-image rows. When all the landscape image rows are collated in the way described above, the result 1490 is the rotated two-dimensional landscape image, e.g., 510*d*.

FIGS. 14*b* and 14*c* further illustrate the collating of the it-th image rows 1430, 1450 described above. As illustrated in FIG. 14*b*, in order to collate 1430 together the rows with row number 'it' in all the complete square sub-images, the collation process loops 1432 through all the complete squares of the portrait image $\{\beta=0,1,\ldots,[m/n]-1;\}$. For each square, the process calculates 1434 the index of the last pixel of the current square row $\{\kappa 0=(\beta+1)*n^2-1+n;\}$. That is, the process marks the cell location in the linear memory array, from which all the pixels belonging to the β square row (of the current sub-image) can be pushed through to the insertion point 1320.

The process loops 1436 through all the pixels in the β square row $\{\alpha=0, 1, \ldots, n-1\}$. For each pixel, the process copies 1438 the last pixel of the remaining part of the square row in the temporary memory cell $\{\text{temp}=\text{Img}[\kappa 0];\}$. The process next shifts 1439 one memory cell to the right all the pixels with memory cells locations $\{s=\kappa 0,\kappa 0-1,\ldots, \text{fix}+1;\}$, and copies the content of the memory cell located at temp into memory cell located at fix. After all the pixels of the β square row have been copied into the cell marked by the insertion point, the process is repeated for the next square row. Step 1430 is done after β square rows of all the complete squares have been collated in this way.

As illustrated in FIG. 14c, the it-th row of the landscape image is completed 1450 by the collation of the it-th row of the remaining (i.e., incomplete square) sub-image. This processing step begins by calculating 1452 the index of the incomplete square (image remainder) $\{\beta=[m/n]-1;\}$. Then, the process calculates 1454 the index of the last pixel of the current row of the incomplete square $\{\kappa 0=(\beta+1)*n^2-1+m \bmod n;\}$. As mentioned earlier, by calculating 1454 the index κ0, the process marks the cell location in the linear memory array from which all the pixels belonging to the β-square row can be pushed through to the insertion point 1320.

The process loops 1456 through all the pixels in the β-square row $\{\alpha=0, 1, \ldots, m \bmod n-1\}$. For each pixel, the process copies 1458 the last pixel of the remaining part of the β-square row in the temporary memory cell $\{\text{temp}=\text{Img}[\kappa 0];\}$. Next, the process shifts 1459 one memory cell to the right all the pixels with memory cell locations $\{s=\kappa 0, \kappa 0-1, \ldots, \text{fix}+1;\}$, and copies the content of the memory cell located at temp into memory cell located at fix. After all the pixels of the β-square row have been copied into the cell marked by the insertion point 1320, the collation of the last β-square row to the it-th row of the landscape image, is complete, and the processing step 1450 is completed.

If the landscape image row, the collation of which is completed by the processing step 1450, is the last row in the landscape image (it=n−1;), the result 1490 is the rotated landscape image, e.g. 510d. If it <n−1, the control is passed to the loop 1420, and the number of the row of the landscape image to be collated is incremented by one (it→it+1;).

The compression process of the present invention includes eliminating empty memory cells (i.e., the filler pixels) that were used to generate a square from a remainder portion. Each empty memory cell is marked by a symbol, such as (−1). After rotation, each cell is inspected to determine whether it contains a (−1). For each cell containing a (−1), the content of all the remaining cells in the linear memory array representation is shifted one cell to the left, and the counter of empty cells is incremented by one. After inspection is completed, a known number of empty cells is located in the tail of the linear memory array, which can be subsequently de-allocated.

The present invention beneficially rotates an original image from a first or initial or original position to a second or final or rotated position in limited memory environments. When the image in first position has a landscape orientation, the present invention cuts, or partitions, the landscape image into a portrait oriented plurality of superimposed sub-images, and then processes each sub-image individually so that each sub-image is rotated individually. In one embodiment, this produces an orthogonal or a ninety-degrees clockwise or counterclockwise rotation of the original image, i.e., it results in the corresponding portrait orientation of the image in the second position.

When the image in first position has a portrait orientation, the present invention immediately partitions the image into sub-images, and then rotates each sub-image individually. The corresponding rows of these sub-images are collated together into rows of the landscape image. When all the rows of the landscape image are collated together, the result is the appropriate landscape orientation of the image in the second position, which is an orthogonal or a ninety-degrees clockwise or counterclockwise rotation of the image in the first, portrait position. Hence, the cutting procedure is used in the case of the first landscape position, and the collating procedure is used in the case of the first portrait position.

The present invention advantageously reduces a ninety-degree rotation of a whole image to independent rotations of the sub-images into which the image is decomposed. These rotations are independent, and therefore, can be performed in parallel, using multiple processing units. Another advantage of the invention is that it allows substantial memory savings with respect to the use of the conventional rotation algorithm that doubles the size of the memory needed to store the image.

The rotation of all the sub-images, except the last one, does not require additional memory. The rotation of the last sub-image, when it is not a maximal inscribed square, requires allocation of additional storage space proportional to $m_s^2-m_s*(M_s \bmod m_s)$. Expressed in percentages of the space needed by the conventional rotation algorithm, this yields $((m_s-M_s \bmod m_s)/M_s)*100\%$ so that memory savings may be $((M_s \bmod m_s+M_s-m_s)/M_s)*100\%$.

In addition, pixel shifting, involved in the cut and the collation procedures (e.g., FIGS. 7a, 7b-1 through 7b-16, 7c, 8a, 8b 13a, 13b-1 through 13b-24, 13c, 14a, 14b, and 14c) of the present invention may be beneficially implemented as circular shift register functions on a programmable memory array. This advantageously allows an implementation of the present invention to be extremely fast, especially for bi-level images, where one pixel is associated with one bit of information. Further, note that the geometric interpretation of the cut and the collation procedures may be translation of the sub-images from their initial image position to their final image position.

From the above description of the preferred embodiments, one skilled in the art should understand that the present invention can rotate an image by processing each sub-image separately as a portrait sub-image and/or a landscape sub-image. For example, referring to the landscape to portrait rotation of the image in FIG. 3, the first three sub-images 315a, 315b, 315c can be rotated using the process described above for the m<n rotation. The last sub-image 315d can be rotated using the process described above for m≧n rotation. The sub-images may then be concatenated together. Thus, the present invention can further save memory resources by using the two rotation processes together because the need for additional memory cells to complete a square may be eliminated.

Moreover, the processing of each sub-image can occur sequentially or in parallel. That is, because each sub-image can be processed independently, there is an advantageous increase in system speed and efficiency. In addition, it should be recognized that the present invention may be applied to both two-dimensional and three-dimensional image processing.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. An image processing system for rotating an image between an initial image position and a final rotated image position, the image having m rows of pixels and n columns of pixels, m and n having integer values, the system comprising:

an orientation module, disposed to receive the image for identifying an orientation of the initial image position as at least one of portrait and landscape;

a partition module, disposed to receive the image, for partitioning the image into at least one sub-image, each sub-image being a maximal inscribed square comprising a plurality of pixels;

a square completion module, disposed to receive a non-square sub-image, the square completion module adapted for adding filler pixels to produce a square sub-image;

a rotation module, disposed to receive each sub-image of the partitioned image, for rotating the pixels of each sub-image; and a concatenation module, disposed to receive each rotated sub-image, for concatenating the rotated sub-images to produce the image in the final image position.

2. The image processing system as in claim 1, wherein the partition module comprises a cut module for rearranging the image into at least one sub-image to generate the fmal rotated image position.

3. The image processing system as in claim 1, wherein the concatenation module comprises a collation module for collating the plurality of sub-images to produce the image in the final rotated image position.

4. The image processing system for rotating an image as in claim 1, further comprising a compression module, disposed to receive the image produced in the final image position for eliminating the filler pixels.

5. The image processing system for rotating an image as in claim 1, wherein the pixels of the image are in a linear memory array.

6. The image processing system for rotating an image as in claim 5, wherein the filler pixels comprise at least one empty memory cell added to the linear memory array to produce the square sub-image in response to the sub-image being a non-square sub-image.

7. The image processing system as in claim 1, wherein at least two sub-images are rotated independently of each other.

8. The image processing system as in claim 1, wherein at least two sub-images are rotated simultaneously.

9. The image processing system as in claim 1, wherein a maximal inscribed square sub-image is formed by adding filler pixels to a rectangular remainder.

10. In an image processing system, a method for rotating an image by an orthogonal angle to a rotated position, the image in an image memory space, the method comprising:

partitioning the image into at least one sub-image, each sub-image being a maximal inscribed square having at least two pixels;

adding R filler pixels to a non-square sub-image to generate a square sub-image, R having an integer value;

rotating the pixels within each sub-image; and concatenating the rotated sub-images to generate the image in the rotated position;

wherein the image is rotated substantially within the image memory space.

11. The method for rotating the image as in claim 10, wherein the pixels in the image comprise m rows of pixels and n columns of pixels.

12. The method for rotating the image as in claim 11, wherein partitioning the image when m is less than n, comprises cutting the image into at least two sub-images, at least one sub-image having m pixels by m pixels.

13. The method for rotating the image as in claim 11, wherein concatenating the image, when m is at least equal to n, comprises collating the rotated sub-images.

14. The method for rotating the image as in claim 11, wherein the pixels of the image are in a linear memory array.

15. The method for rotating the image as in claim 14, further comprising inverting an order of the pixels in the linear memory array, to rotate the image in a counterclockwise direction.

16. The method for rotating the image as in claim 10, further comprising compressing the rotated image to eliminate the R filler pixels.

17. The method for rotating the image as in claim 10, wherein rotating the pixels in each sub-image further comprises:

identifying at least one boundary layer of the sub-image, each boundary layer comprising at least two pixels; and for each boundary layer, cycling through the pixels to move individual pixels from a source location to a destination location within each boundary layer.

18. The method for rotating an image as in claim 17, wherein cycling from the first location to the second location is in response to a pixel index and an iteration index.

19. The method for rotating the image as in claim 10, wherein at least two sub-images are rotated independently of each other.

20. The method for rotating the image as in claim 10, wherein at least two sub-images are rotated simultaneously.

21. An image processing system for rotating an image by an orthogonal angle to a rotated position, the image having at least two pixels in m pixel rows and n pixel columns, m and n each having an integer value, the system comprising:

a processor;

a memory, coupled to the processor, the memory including a set of instructions and a linear array of memory cells for storing the pixels, the number of memory cells being substantially the same as a number of memory cells for storing just the image, the set of instructions designed for execution by the processor to generate the image in the rotated position in response to the processor:

determining whether m is less than n;

in response to m being less than n, partitioning the image into at least two sub-images, at least one sub-image having m pixels by m pixels, and rotating the pixels in each sub-image for generating the image in the rotated position;

in response to m being at least equal to n, partitioning the image into at least two sub-images, at least one sub-image having n pixels by n pixels, rotating the pixels in each sub-image, and collating the sub-images to generate the image in the rotated position; and generating the image in the rotated position in response to the processor adding R filler pixels to a non-square sub-image to generate a square sub-image, R having an integer value.

22. The system as in claim 21, wherein the instructions for execution by the processor to generate the image in the rotated position in response to the processor compress the rotated image to eliminate the R filler pixels.

23. The system as in claim 21, wherein the instructions for execution by the processor to generate the image in the rotated position in response to the processor:

identify an insertion point for a source pixel in the linear memory cell array, the linear memory cell array comprising a plurality of memory cell locations, the source pixel from a source memory cell location within the linear memory cell array;

store the source pixel in a temporary memory cell location;

shift each pixel, located in memory cell locations subsequent to the source memory cell location up to the insertion point, into the adjacent memory cell location; and insert the source pixel into the memory cell location at the insertion point.

24. The system as in claim 21, wherein the instructions for execution by the processor to generate the image in the rotated position in response to the processor:

identify at least one boundary layer of the sub-image, each boundary layer comprising at least two pixels; and for each boundary layer, cycle through the pixels to move individual pixels from a source location to a destination location within each boundary layer.

25. The system as in claim 21, wherein at least two sub-images are rotated independently of each other.

26. The system as in claim 21, wherein at least two sub-images are rotated simultaneously.

* * * * *

UNITED STATES PATENT AND TRADEMARK OFFICE
CERTIFICATE OF CORRECTION

PATENT NO. : 6,275,622 B1
DATED : August 14, 2001
INVENTOR(S) : Radovan V. Krtolica It is certified that error appears in the above-identified patent and that said Letters Patent is hereby corrected as shown below:

Column 12,
Line 33, "FIG. 7b2." should read -- FIG. 7b-2. --.

Column 13,
Line 12, "18" should be deleted

Column 16,
Line 60, "91 5a," should read -- 915a, --.

Column 18,
Line 42, "$m(^{(r)}$" should read -- $m^{(r)}$ --.

Column 24,
Line 3, "3" should be deleted.

Column 27,
Line 36, "fmal" should read -- final --.

Signed and Sealed this

Twentieth Day of August, 2002

Attest:

JAMES E. ROGAN
Attesting Officer  Director of the United States Patent and Trademark Office